United States Patent
Nakamura

(10) Patent No.: US 10,829,062 B2
(45) Date of Patent: Nov. 10, 2020

(54) IN-VEHICLE COMMUNICATION SYSTEM

(71) Applicant: DENSO CORPORATION, Kariya (JP)

(72) Inventor: Mitsuru Nakamura, Kariya (JP)

(73) Assignee: DENSO CORPORATION, Kariya (JP)

( * ) Notice: Subject to any disclaimer, the term of this patent is extended or adjusted under 35 U.S.C. 154(b) by 28 days.

(21) Appl. No.: 16/251,530

(22) Filed: Jan. 18, 2019

(65) Prior Publication Data
US 2019/0225168 A1 Jul. 25, 2019

(30) Foreign Application Priority Data

Jan. 23, 2018 (JP) ................................ 2018-008686

(51) Int. Cl.
*B60R 16/023* (2006.01)
*H04L 29/08* (2006.01)
*B60R 11/04* (2006.01)
*G06F 13/42* (2006.01)

(52) U.S. Cl.
CPC ............ *B60R 16/023* (2013.01); *B60R 11/04* (2013.01); *G06F 13/4247* (2013.01); *H04L 67/12* (2013.01)

(58) Field of Classification Search
CPC ....... B60R 16/023; B60R 11/04; H04L 67/12; H04L 12/40006; H04L 2012/40215; H04L 2012/40273; G06F 13/4247
See application file for complete search history.

(56) References Cited

U.S. PATENT DOCUMENTS

| | | | | |
|---|---|---|---|---|
| 6,075,438 | A * | 6/2000 | Abe ....................... | G05B 15/02 340/286.01 |
| 6,289,398 | B1 * | 9/2001 | Stallmo ................. | G06F 3/0608 710/5 |
| 7,456,701 | B2 * | 11/2008 | Fujimori ................... | G06F 3/14 257/E23.177 |
| 9,768,979 | B2 * | 9/2017 | Koo .................... | H04L 12/4013 |
| 2001/0054519 | A1 | 12/2001 | Nishiwaki et al. | |
| 2007/0017310 | A1 * | 1/2007 | Matsuzaki ............ | F16H 59/105 74/335 |

(Continued)

FOREIGN PATENT DOCUMENTS

JP 2011-183928 9/2011

OTHER PUBLICATIONS

Tashiro Arihiro, Control and monitoring direction! Introduction to small network CAN communication, issued Jun. 2016.

*Primary Examiner* — Pinping Sun
(74) *Attorney, Agent, or Firm* — Maschoff Brennan

(57) ABSTRACT

An in-vehicle communication system includes communication lines connecting ECUs together in the form of a daisy chain, has a maximum transferable data length of 64 bytes or more, and selects a speed of data transfer from one of a plurality of transmission speeds more than or equal to 2 Mbps. Each ECU includes a substrate-side connector with surface-mounted connector pins. The connector pins include a first connector pin pair and a second connector pin pair. The first connector pin pair has leads whose lengths equal to each other. The second connector pin pair has leads whose lengths are equal to each other and different from those of the second connector pin pair. This minimizes the distortion of waveform of signals when the signals are transmitted at a speed higher than that in a high-speed CAN, thereby enables the number of nodes to be increased.

4 Claims, 17 Drawing Sheets

(56) References Cited

U.S. PATENT DOCUMENTS

| | | | |
|---|---|---|---|
| 2009/0056446 A1* | 3/2009 | Cluff | G01P 1/023 |
| | | | 73/514.16 |
| 2012/0117315 A1* | 5/2012 | Okada | G06K 19/07732 |
| | | | 711/103 |
| 2012/0201010 A1* | 8/2012 | Furuta | H01H 85/0241 |
| | | | 361/752 |
| 2012/0207461 A1 | 8/2012 | Okuda | |
| 2012/0327978 A1* | 12/2012 | Nishimura | H04L 12/40032 |
| | | | 375/211 |
| 2014/0022912 A1* | 1/2014 | Kim | H04L 49/351 |
| | | | 370/244 |
| 2014/0133350 A1* | 5/2014 | Triess | H04L 41/0893 |
| | | | 370/254 |
| 2014/0301491 A1* | 10/2014 | Yamamoto | H04B 3/548 |
| | | | 375/257 |
| 2015/0349471 A1* | 12/2015 | Maki | B60R 16/0215 |
| | | | 307/10.1 |
| 2018/0131700 A1* | 5/2018 | Ando | H04L 63/0281 |
| 2018/0284398 A1 | 10/2018 | Furutake et al. | |
| 2019/0146322 A1 | 5/2019 | Chitaka et al. | |
| 2019/0356080 A1* | 11/2019 | Yoshida | H01R 13/646 |
| 2019/0362620 A1* | 11/2019 | Golzi | G08B 29/16 |

\* cited by examiner

IN-VEHICLE COMMUNICATION SYSTEM

CROSS REFERENCE TO RELATED DOCUMENT

The present application claims the benefit of priority of Japanese Patent. Application. No. 2018-8686 filed on Jan. 23, 2018, the disclosure of which is incorporated herein by reference.

BACKGROUND

1 Technical Field

This disclosure relates generally to an in-vehicle communication system.

2 Background. Art

Japanese Patent No. 3685388 teaches an in-vehicle communication system using a CAN bus (Controller Area Network Bus). The in-vehicle communication system has a structure with a high-speed CAN offering a transmission speed (i.e., a data transfer rate) of 500 kbps and a low-speed CAN offering a transmission speed of 125 kbps. In typical CAN buses, a plurality of ECUs (Electronic Control. Units) and transmission cables are connected using line topology.

In the above system, the transmission speed is as low as 500 kbps. There is, thus, a demand to achieve transmission at high speeds. There are automotive communication protocols which offer transmission speed higher than that in the high-speed CAN. When communication is established at speeds higher than that in the high-speed CAN, it leads to a risk that the use of the line topology results in distortion in signal, thus resulting in a decrease in number of connectable nodes.

SUMMARY

It is an object of this disclosure to provide an in-vehicle communication system to overcome the above problems.

According to one aspect of this disclosure, there is provided an in-vehicle communication system which comprises: (a) a plurality of ECUs (Electronic Control Units); and (b) communication lines which connect the ECUs together in the form of a daisy chain, each of the communication lines including a first wire pair and a second wire pair, the communication lines providing at least one of the ECUs other than those lying at ends of the daisy chain with connections to the first wire pair and the second wire pair.

The in-vehicle communication system has a maximum transferable data length of 64 bytes or more and works to select a transmission speed of data transfer from one of a plurality of transmission speeds more than or equal to 2 Mbps.

Each of the ECUs includes a wiring substrate and a substrate-side connector which achieves connections of the wiring substrate with the communication lines. The substrate-side connector includes a connector case and a plurality of surface-mounted connector pins which are disposed outside the connector case and connected to the wiring substrate.

The connector pins of each of the ECUs includes a first connector pin pair connected to the first wire pair and a second connector pin pair connected to the second wire pair. The first connector pin pair has leads whose heights from a surface of the wiring substrate are equal to each other. The second connector pin pair having leads whose heights from the wiring substrate are equal to each other. The heights of the leads of the first connector pin pair are different from the heights of the leads of the second connector pin pair.

As apparent from the above discussion, the in-vehicle communication system to establish communication at a transmission speed of 2 Mbps or more and uses the daisy chain, thereby resulting in a decrease in distortion of the waveform of signals as compared with the conventional bus topology. The substrate-side connector of each of the ECUs uses the surface-mounted connector pins to achieve connection with the wiring substrate, thereby eliminating a risk that use of through-hole mounted connector pins causes the connector pins to pass through the wiring substrate and appear outside the reverse surface thereof as stubs which will lead to generation of unwanted reflected waves which results in the distortion of the waveform of signals. The leads of the first connector pins for the first wire pair are located at the same height from the surface of the wiring substrate. Similarly, the leads of the second connector pins for the second wire pair are located at the same height from the surface of the wiring substrate. This minimizes a risk that the symmetry of signals transmitted through the first wire pair or the second wire pair is deteriorated and thus reduces the distortion of the waveform of the signals. The heights of the leads of the first connector pin pair are selected to be different from those of the second connector pin pair, so that the second connector pin pair is not arranged between the protrusions of the first connector pin pair outside the connector case. Similarly, the first connector pin pair is not arranged between the protrusions of the second connector pin pair outside the connector case. This minimizes a risk that the symmetry of signals transmitted through the first and second connector pin pairs is deteriorated, which reduces the distortion of the waveform of the signals.

BRIEF DESCRIPTION OF THE DRAWINGS

The present invention will be understood more fully from the detailed description given hereinbelow and from the accompanying drawings of the preferred embodiments of the invention, which, however, should not be taken to limit the invention to the specific embodiments but are for the purpose of explanation and understanding only.

In the drawings.

DESCRIPTION OF THE PREFERRED EMBODIMENTS

A. Structure of In-Vehicle Communication System

Figure 1:
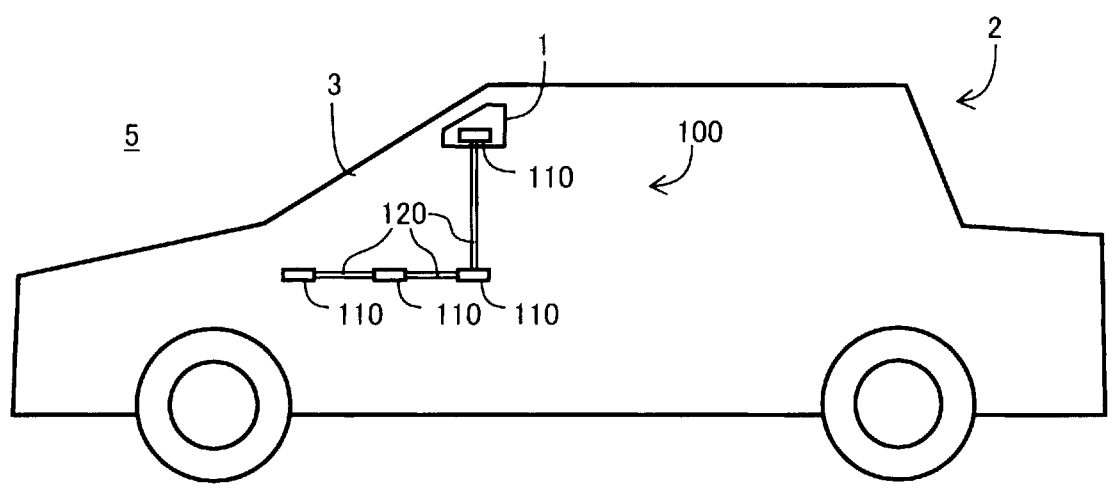
FIG. 1 is an explanatory view which illustrates an in-vehicle communication system according to the first embodiment.

The vehicle 2 is, as illustrated in FIG. 1, equipped with the camera module 1 mounted inside the front windshield 3. The camera module 1 is engineered to capture the outside view 5 of the vehicle 2. The structure of the camera module 1 will be described later in detail. The vehicle 2 is equipped with a plurality of ECUs 110 and also has constructed therein the automotive communication system 100 serving as an in-vehicle LAN including communication lines 120 connecting the ECUs 110 together. The communication system 100 is, as described later, engineered to establish communication at as high as 2 Mbps or more. The camera module 1 includes the ECU 110 working as a camera ECU with a control circuit to control an operation of a camera. The other ECUs 110 include, for example, an automated driving ECU, an actuator control. ECU, a brake control. ECU, and a steering angle control ECU.

The ECUs 110 are connected together using the communication lines 120 in the form of a daisy chain. The communication lines 120 include the wire pairs 120_1 and 120_2 connecting between wire-side connectors 122. The communication lines 120 provide some (or at least one) of the ECUs 110 (which will also be referred to as a first and a second ECU 110) other than those lying at ends of the daisy chain (which will also be referred to as a third and fourth ECU 110) with connections to the first wire pair 120_1 and the second wire pair 120_2 of the communication lines 120. The wire pairs 120_1 and 120_2 have the same structure. For example, each of the wire pairs 120_1 and 120_2 is made of a twisted pair of wires.

The reason why the ECU 110 are connected in the form of the daisy chain in this embodiment is that when the transmission speed is set to as high as 2 Mbps or more, the bus topology (also called the line topology) results in a great distortion in waveform of a communication signal, which leads to a decrease in number of nodes (i.e., the ECUs 110) connectable with the communication lines 120. The use of the daisy chain enables a signal to be transmitted through the ECUs 110 without a great distortion thereof, thus permitting the number of connectable nodes to be increased.

Each of the ECUs 110 is equipped with the processor 112 with the memory 114, the communication controller 116, the transceiver 118, the substrate-side connector 130, and the wiring substrate 140. The substrate-side connector 130 is connected to the wire-side connectors 122. The transceiver 118 is designed to be connectable with the two wire pairs 120_1 and 120_2 through the wiring substrate 140 and the connectors 130 and 122.

Each of the first wire pairs 120_1 includes two conductors: the high-voltage wire 120_1H and the low-voltage wire 120_1L. The high-voltage wire 120_1H is used to transmit a signal higher in voltage than that in the low-voltage wire 120_1L. The second wire pair 120_2 includes, like the first wire pair 120_1, two conductors: the high-voltage wire 120_2H and the low-voltage wire 120_2L. The high-voltage wires 120_1H and 120_2H are high-wires (i.e., CAN_H wires) in a CAN bus (Controller Areas Network Bus) standard. The low-voltage wires 120_1L and 120_2L are low-wires (i.e., CAN_L wires) in the CAN bus standard. Signals transmitted through the low-wires are differential pairing signals derived by reversing the waveform of signals transmitted through the high-wires and shifting the level thereof.

"_1" and "_2" of reference symbols of the wire pairs 120_1 and 120_2 are used only for discriminating between two pairs of conductors connected to each of the ECUs 110 for the sake of convenience. "H" and "L" used in each of reference symbols "_1H", "_1L", "_2H", and "_2L" represent a high-wire and a low-wire of each wire pair, respectively. When it is not necessary to discriminate therebetween, the above symbols may be omitted here. The same applies to other elements.

It is preferable that the high-voltage wires 120_1H and 120_2H are connected together using a conductor patterned on the wiring substrate 140. Similarly, it is preferable that the low-voltage wires 120_1L and 120_2L are connected using a conductor patterned on the wiring substrate 140. In this way, the logical topology of the ECUs 110 is the bus topology, thus enabling the transmission to be achieved according to the CAN bus standard. The ECUs 110 may alternatively be connected together in another way or according to another standard other than the CAN bus standard.

The ECUs 110 are, as described above, connected physically in the form of the daisy chain and logically in the form of the bus topology. "physical daisy chain-connection", as referred to herein, means that the communication lines 120 between the ECUs 110 are connected together through the substrate-side connectors 130 of the ECUs 110, and each of the substrate-side connectors 130 connects a corresponding one of the ECUs 110 with the two wire pairs 120_1 and 120_2. "bus topology", as used in the typical CAN bus, means that Each of the ECUs 110 is connected to the one wire pair 120_1H and 120_1L or 120_2H and 120_2L leading from the communication lines 120.

The communication controller 116 in each of the ECUs 110 mediates transmission of signals between the processor 112 and the transceiver 118 and also controls communication with the other ECUs 110. The transceiver 118 works to achieve transmission of signals between itself and the other ECUs 110. In this embodiment, the automotive communication system 100 is designed to have a maximum transferable data length of 64 bytes or more. The communication system 100 is capable of selecting the speed (also called transmission speed or bit rate) of data transfer from one of a plurality of transmission speeds more than or equal to 2 Mbps. For instance, the communication system 100 selectively uses one of five transmission speeds: 2 Mbps, 3 Mbps, 6 Mbps, 8 Mbps, and 10 Mbps. The communication system 100 may be engineered to achieve the communication in the above way according to the CAN FD (CAN Flexible Data Rate: ISO 11892-1:2015) protocol.

The wiring substrate 140 of each of the ECUs 110 has mounted thereon the substrate-side connector 130 for connection with the wire-side connectors 122 of the communication lines 120. The wiring substrates 140 will also be referred to as control boards.

Figure 3:
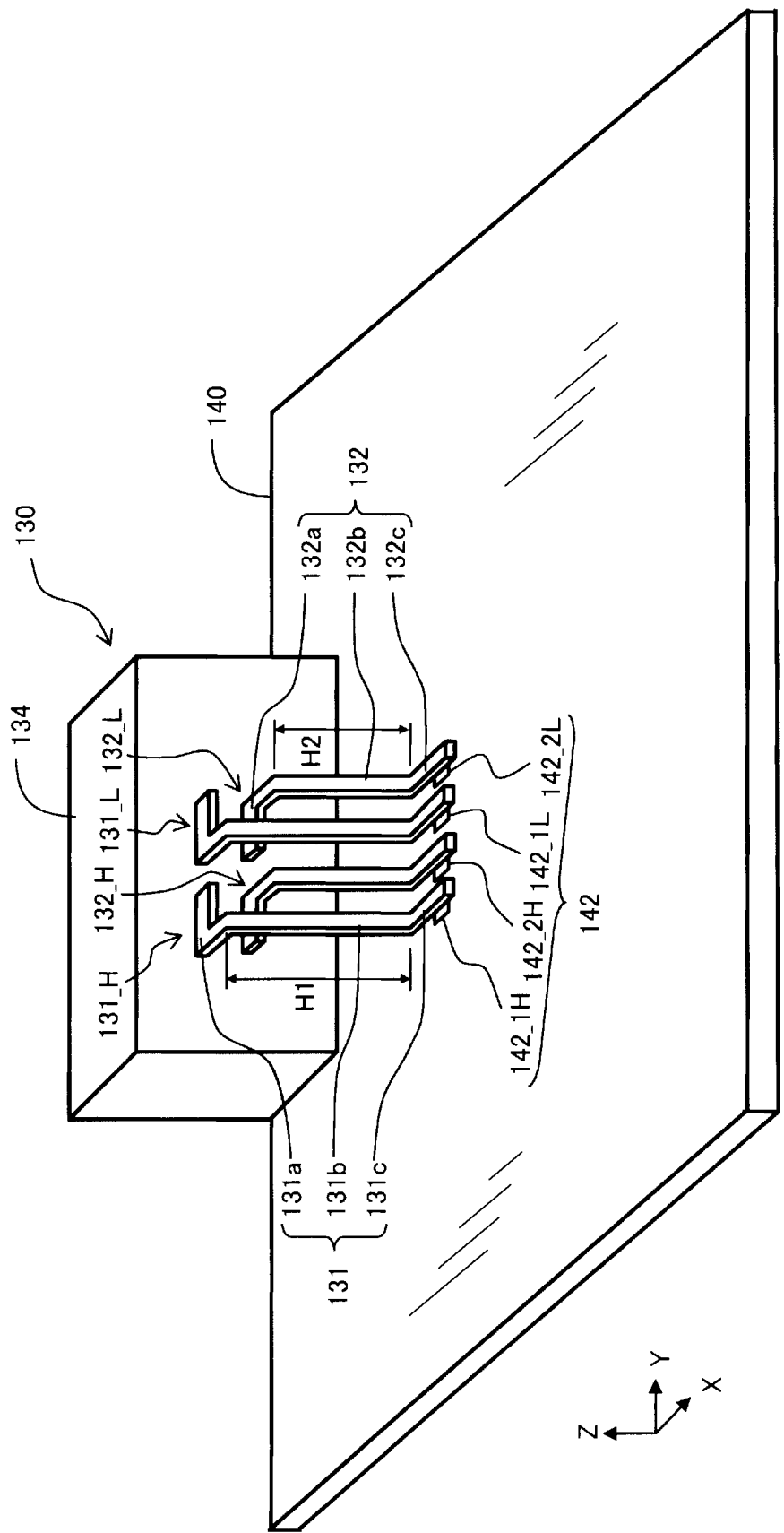
FIG. 3 is an explanatory view which illustrates connections between a substrate-side connector and a wiring substrate.

Each of the substrate-side connectors 130, as illustrated in FIG. 3, includes the connector case 134 and a plurality of surface-mounted connector pins 131 and 132 disposed outside the connector case 134. FIG. 3 omits circuit components other than the connector 130 for the brevity of illustration. The connector pins 131 and 132 are connected to a plurality of lands 142 mounted on the surface of the wiring substrate 140.

The reason why the surface-mounted connector pins 131 and 132 is that when the transmission speed is set to as high as 2 Mbps or more, the distortion of signals will be decreased. For instance, use of through-hole mounted connector pins causes the connector pins to pass through the wiring substrate 140 and appear outside the reverse surface thereof as stubs which will lead to generation of unwanted reflected waves. In contrast, the use of the surface-mounted connector pins 131 and 132 does not cause the generation of unwanted reflected waves, thus resulting in decrease in distortion of signals.

A pair of first connector pins 131_H and 131_L are connector terminals for connection with the wires 120_1H and 120_1L of the first wire pair 120_1. In FIG. 3, the X-arrow and the Y-arrow indicate horizontal directions when the wiring substrate 140 is placed horizontally. The Z-arrow indicates the vertical direction. When the wiring substrate 140 is placed horizontally, each of the connector pins 131 includes the protrusion 131a extending horizontally from the connector case 134, the lead 131b extending downward from the head of the protrusion 131a, and the contact 131c extending horizontally from the head of the lead 131b. The contact 131c is soldered to the land 142.

A pair of second connector pins 132_H and 132_L are connector terminals for connection with the wires 120_2H and 120_2L of the second wire pair 120_2. When the wiring substrate 140 is placed horizontally, each of the connector pins 132 includes the protrusion 132a extending horizontally from the connector case 134, the lead 132b extending downward from the head of the protrusion 132a, and the contact 132c extending horizontally from the head of the lead 132b. The contact 132c is soldered to the land 142.

The lands 142 include the first high-voltage land 142_1H and the first low-voltage land 142_1L for the first wire pair 120_1, and the second high-voltage land 142_2H and the second low-voltage land 142_2L for the second wire pair 120_2. The first connector pins 131_H and 131_L are connected to the first high-voltage land 142_1H and the first low-voltage land 142_1L, respectively. The second connector pins 132_H and 132_1, are connected to the second high-voltage land 142_2H and the second low-voltage land 142_2L, respectively.

The leads 131b of the first connector pins 131 (which will also be referred to as a first connector pin pair) have heights H1 from the surface of the wiring substrate 140 which are equal to each other. The leads 132b of the second connector pins 132 (which will also be referred to as a second connector pin pair) have heights H2 from the surface of the wiring substrate 140 which are identical with each other. The height H1, as referred to herein, is a length of each of the leads 131b itself and different from the height H2 that, as referred to herein, is a length of each of the leads 132g itself. In the example of FIG. 3, the heights (i.e., the lengths) H1 and H2 are selected to meet a relation of H2<H1, but they may alternatively be selected to have a relation of H1<H2. In this embodiment, the heads 131b of the first connector pins 131 have the same height H1. The leads 132b of the second connector pins 132 have the same height H2. This offers the beneficial advantage that decreases a risk that symmetry of signals transmitted through the wire pair 120_1 and 120_2 is deteriorated. The height H1 of the lead 131b of each of the first connector pins 131 is different from the height H2 of the lead 132b of each of the second connector pins 132, thereby causing the second connector pin 132 is not disposed between the protrusions 131a of the first connector pins 131, in other words, not to be aligned with the protrusions 131a of the first connector pins 131 in the direction Y. Similarly, the first connector pin 131 is not disposed between the protrusions 132a of the second connector pins 132 in the direction Y. This layout decreases a risk that the symmetry of signals transmitted through the first connector pins 131 and the symmetry of signals transmitted through the second connector pins 132 are deteriorated, thereby decreasing the distortion of waveforms of signals.

When the wiring substrate 140 is placed horizontally, the protrusions 131a and 132a of the high-voltage connector pins 131_H and 132_H on the connector case 143 are laid to overlap each other in the vertical direction Z. Similarly, the protrusions 131a and 132a of the low-voltage connector pins 131_L and 132_L on the connector case 143 are laid to overlap each other in the vertical direction Z. This layout enables the connector 130 to have a decreased dimension in the direction Y. It is also possible to decrease distances between the high-voltage connector pins 131_H and 132_H and between the low-voltage connector pins 131_L and 132_L, thereby further decreasing the distortion of the waveform of signals. In the example of FIG. 3, the vertical overlap of the protrusions 131a and 132a is achieved by forming the protrusions 131a and 132a in an L-shape. The L-shape facilitates the ease with which the protrusions 131a and 132a are laid to overlap each other in the vertical direction Z. The protrusions 131a and 132a may, however, be arranged in another layout or formed in another shape.

Figure 2:
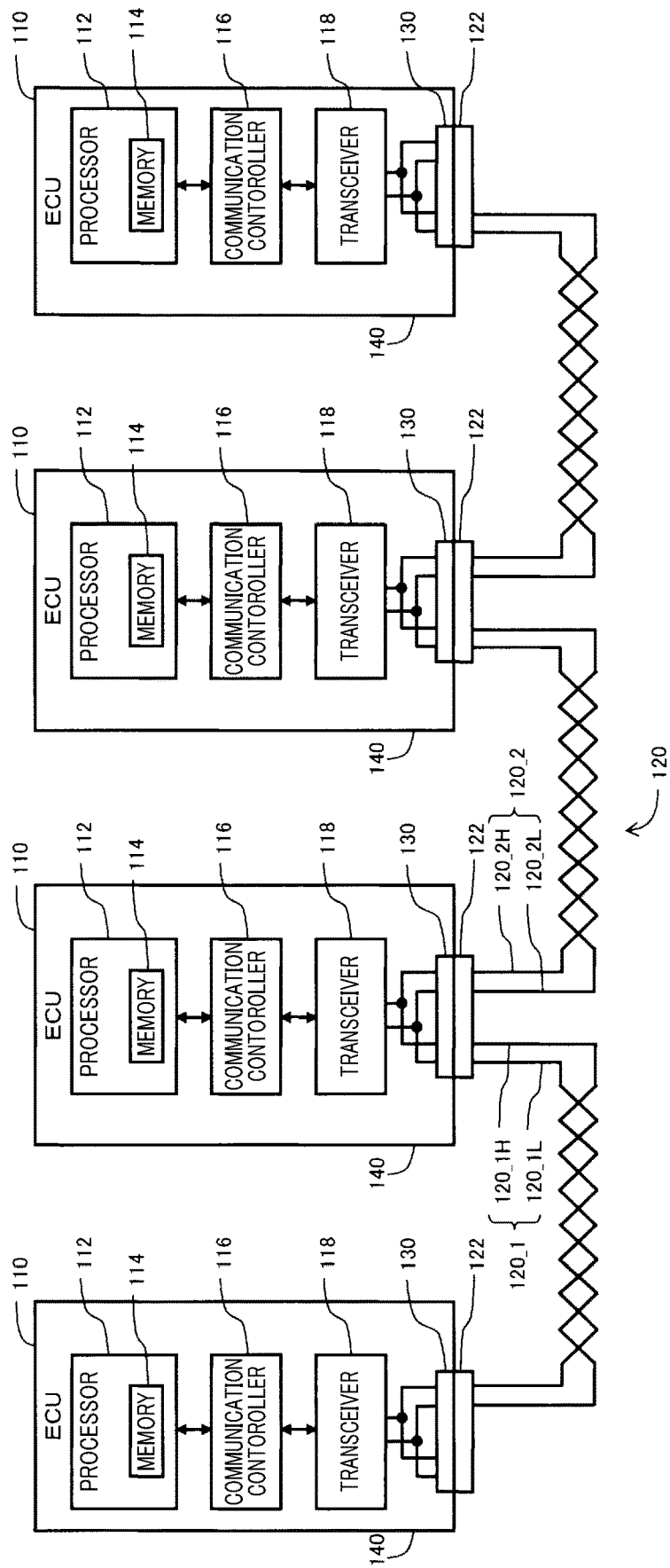
FIG. 2 is a block diagram which illustrates connections of ECUs with communication line.
Figure 4:
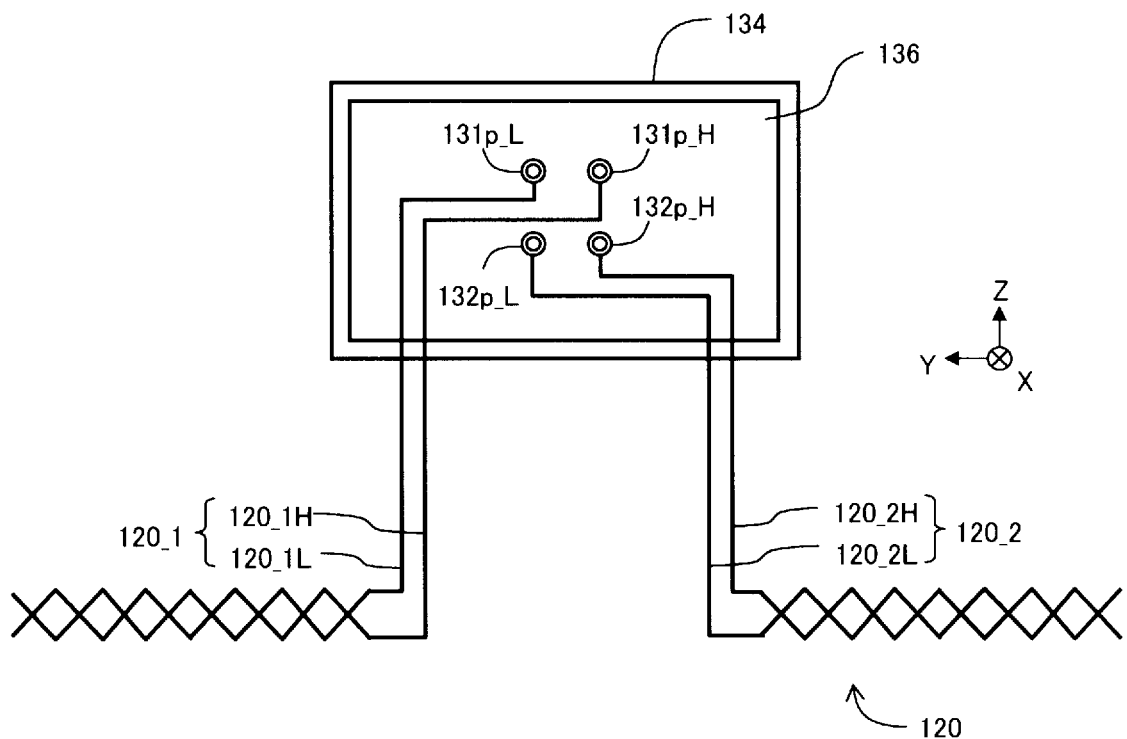
FIG. 4 is an explanatory view which illustrates fittings of the substrate-side connector.

Each of the connector cases 134, as illustrated in FIG. 4, has the fitting portion 136 which is formed in a back surface thereof in the shape of a socket for fitting the wire-side connector 122 (see FIG. 2) therein. In the example of FIG. 4, the fitting portion 136 is shaped in the form of a recess. Ends 131p_H, 131p_L, 132p_H, and 132p_L of the connector pins 131 and 132 (which will also be referred to below as fitting pin ends or connector pin ends) protrude from the fitting portion 136. The first connector pin ends 131p_H and 131p_L are connected to the first wire pair 120_L. The second connector pin ends 132p_H and 132p_L are connected to the second wire pair 120_2. For the sake of convenience, FIG. 4 omits the wire-side connector 122 shown in FIG. 2. There are no connector pin ends between the connector pin ends 131p_H and 131p_L of the first connector pins 131, thereby decreasing a risk that symmetry of signals transmitted through the connector pin ends 131p is deteriorated and also decreasing the distortion of the waveform of signals. The same applies to the connector pin ends 132p_H and 132p_L of the second connector pins 132. Portions of the connector pins 131 and 132 continuing from the connector pin ends 131p and 132p pass straight through the connector case 134 and extend, as illustrated in FIG. 3, outside the connector case 134 as the protrusions 131a and 132a.

Figure 5:
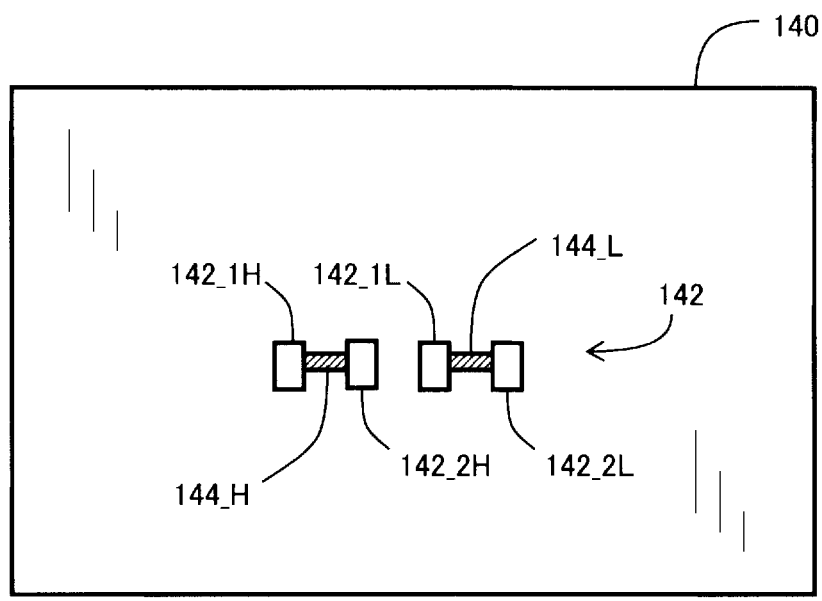
FIG. 5 is an explanatory view which illustrates layout of lands and wiring patterns on a wiring substrate.

The first high-voltage land 142_1H and the second high-voltage land 142_2H are, as clearly illustrated in FIG. 5, arranged adjacent each other without any other lands therebetween on the surface of the wiring substrate 140. The high-voltage lands 142_1H and 142_2H are connected together through the wiring pattern 144_H on the wiring substrate 140. The first low-voltage land 142_1L and the second low-voltage land 142_2L are arranged adjacent each other without any other lands therebetween on the surface of the wiring substrate 140. These low-voltage lands 142_1L and 142_2L are connected together through the wiring pattern 144_1, on the wiring substrate 140. This layout enables the distance between the wiring pattern 144_H and 144_L on the wiring substrate 140 to be decreased, which decreases the distortion of the waveform of signals and also enables an area on the wiring substrate 140 occupied by wires. The layout or configuration of the lands 142 and the wiring patterns 144 may be modified as needed.

As apparent from the above discussion, the in-vehicle communication system 100 in this embodiment is capable of establishing communication at a transmission speed of 2 Mbps or more and uses the daisy chain as the physical topology, thereby resulting in a decrease in distortion of the waveform of signals as compared with the conventional bus topology. The substrate-side connector 130 of each of the ECUs 110 uses the surface-mounted connector pins 131 and 132 to achieve connection with the wiring substrate 140, thereby eliminating a risk that use of through-hole mounted connector pins causes the connector pins to pass through the wiring substrate 140 and appear outside the reverse surface thereof as stubs which will lead to generation of unwanted reflected waves which results in the distortion of the waveform of signals. The leads 131b of the first connector pins 131 for the first wire pair 120_1 are located at the same height H1 from the surface of the wiring substrate 140. Similarly, the leads 132b of the second connector pins 132 for the second wire pair 120_2 are located at the same height H2 from the surface of the wiring substrate 140. This minimizes a risk that the symmetry of signals transmitted through the wire pair 120_1 or the wire pair 120_2 is deteriorated and thus reduces the distortion of the waveform of the signals.

B. In-Vehicle Camera in First Embodiment

An in-vehicle camera (i.e., a camera module) in the first and second embodiments which may be used with the in-vehicle communication system 100 will be described below.

Figure 6:
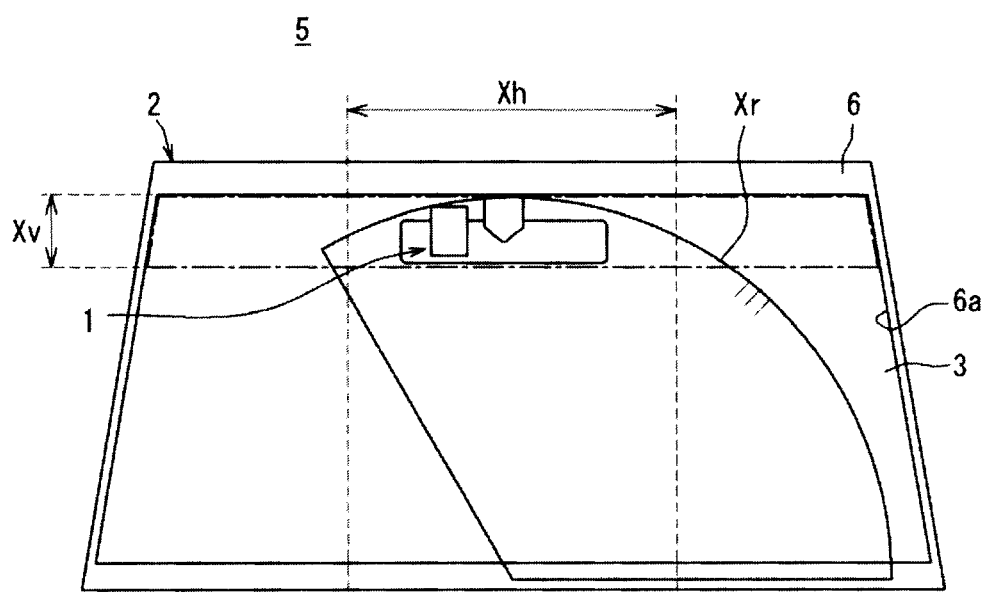
FIG. 6 is a front view which illustrates a vehicle equipped with a camera module according to the first embodiment.
Figure 7:
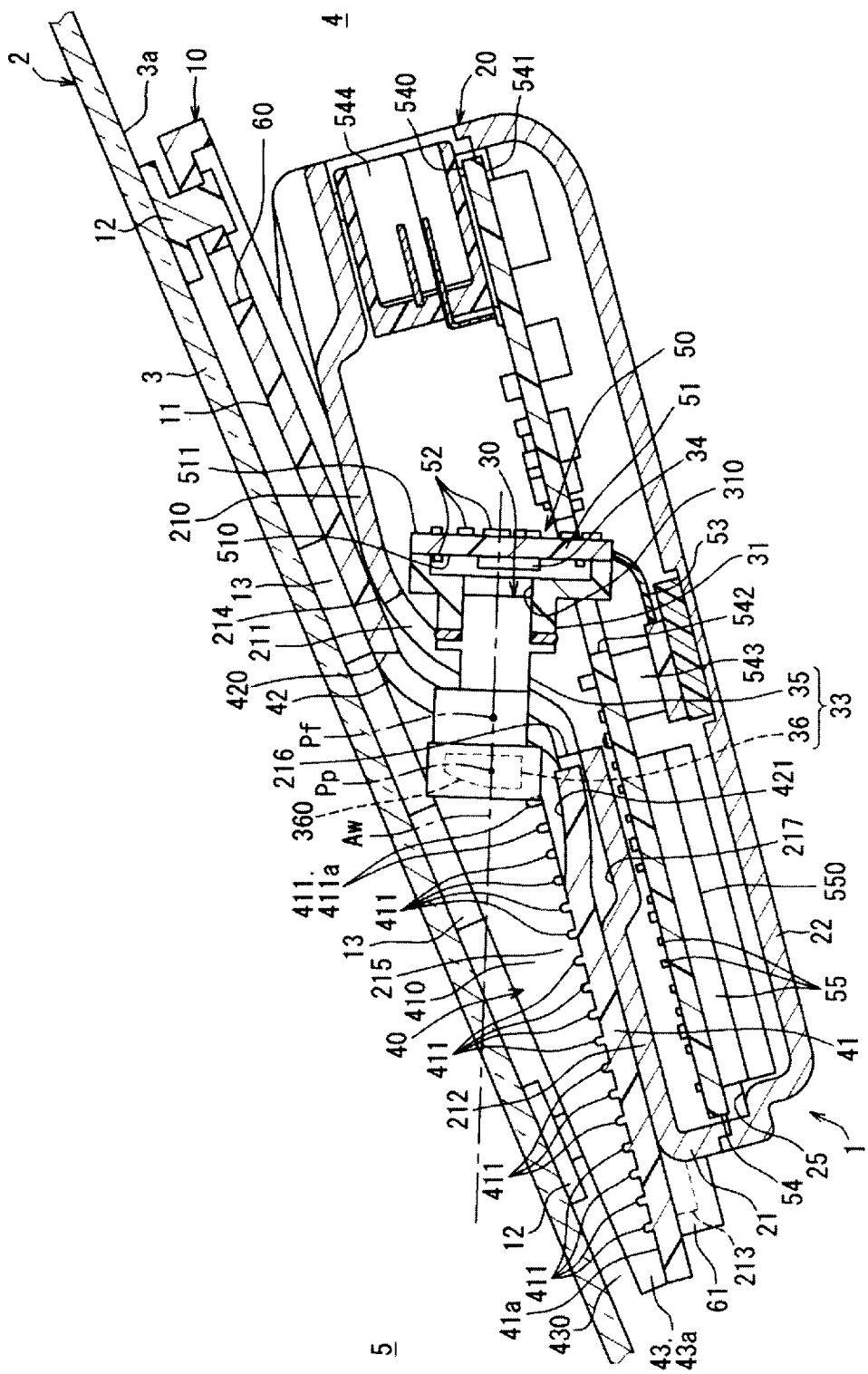
FIG. 7 is a sectional view which illustrates a camera module according to the first embodiment.

FIGS. 6 and 7 illustrate the camera module 1 in the first embodiment. The camera module 1 is mounted in the vehicle 2 to obtain an image of the outside view 5. In the following discussion, the up-and-down direction of the vehicle 2 oriented horizontally will be referred to as a vertical direction. The length-wise direction and width-wise direction of the vehicle 2 oriented horizontally will be referred to as the longitudinal and lateral directions, respectively.

The camera module 1 is attached to an inner surface of the front windshield 3 of the vehicle 2. The front windshield 3 is arranged in front of a driver's seat in the vehicle 2. The front windshield 3 isolates the passenger compartment 4 from the outside view 5. The front windshield 3 is made of a transparent material such as glass to permit light from the outside view 5 to enter the passenger compartment 4.

The camera module 1 is installed in an area on the front windshield 3 which does not block the view of the driver sitting on the driver's seat in the passenger compartment 4. Specifically, a vertical dimension of the area of the windshield 3 (which will also be referred to as a camera 1 installable area) where the camera module 1 is installable is, as illustrated in FIG. 6, selected to a range Xv that is about 20% of the open window 6a of the pillar (i.e., a frame) 6 which retains an outer edge of the windshield 3 from an upper edge of the windshield 3 in the vertical direction. A lateral dimension of the camera installable area is selected to a range Xh that is plus and minus 15 cm from the center of the open window 6a in the lateral direction. The camera installable area, therefore, lies in a wiping range Xr where a wiper sweeps the front windshield 3 and occupies a portion of the windshield 3 which is inclined at about 22° to 90° in the longitudinal direction.

Figure 8:
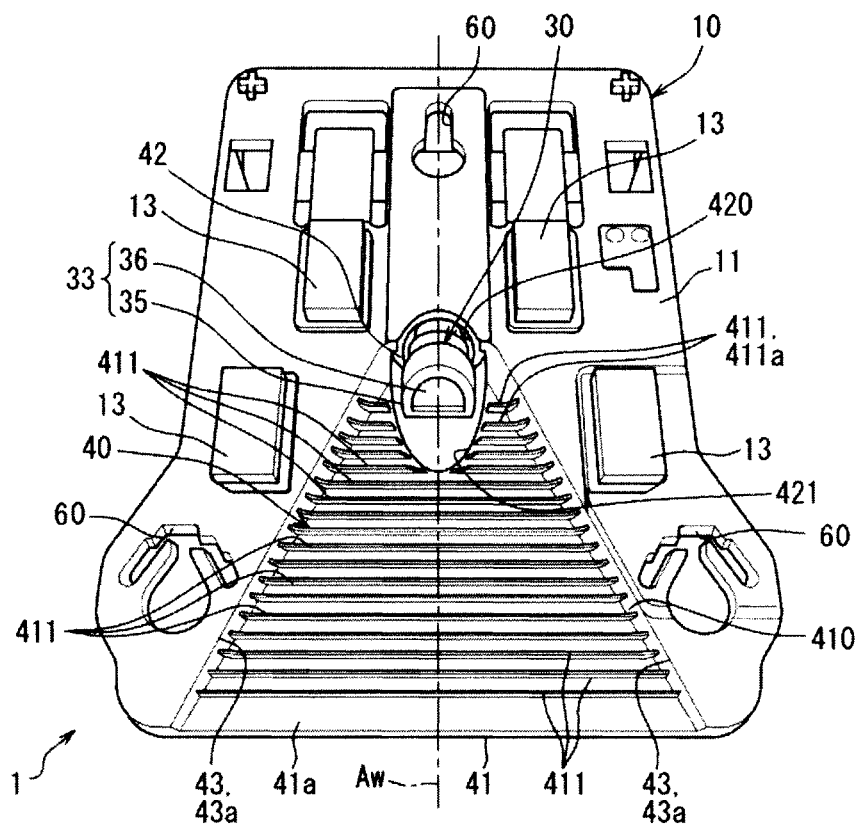
FIG. 8 is a perspective view which illustrates a camera module according to the first embodiment.
Figure 9:
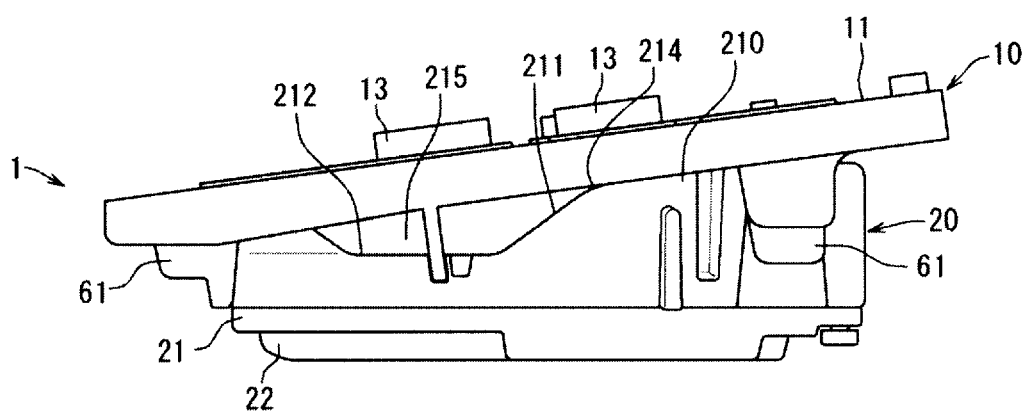
FIG. 9 is a side view which illustrates a camera module according to the first embodiment.

The camera module 1 is, as clearly illustrated in FIGS. 7, 8, and 9, equipped with the bracket assembly 10, the camera casing 20, the imaging assembly 30, the hood 40, and the circuit unit 50.

The bracket assembly 10 includes the bracket 11, the cushions 13, and the attachment pads 12. The bracket 11 is made of an easy-to-form hard material such as resin and of a plate shape as a whole. The bracket 11 is arranged along the inner surface 3a of the front windshield 3. The bracket 11 is equipped with a plurality of cushions 13 which are made of elastomer and work as buffers or shock absorbers.

The bracket 11, as illustrated in FIGS. 7 and 8, has a plurality of attachment slots 60 which pass through a thickness thereof. The attachment pads 12 are provided for the respective attachment slots 60. Each of the attachment pads 12 is made of a resinous base to which adhesive sheet serving as a buffer is affixed. The base of each of the attachment pads 12 is, as illustrated in FIG. 7, fit in a corresponding one of the attachment slots 60, so that it is secured to the bracket 11. The adhesive sheet of each of the attachment pads 12 is affixed to the inner surface 3a of the front windshield 3. With these arrangements, the cushions 13 are disposed between the bracket 11 and the front windshield 3. Each of the attachment pads 12 may be implemented by a suction pad made of elastomer working as a buffer.

Figure 10:
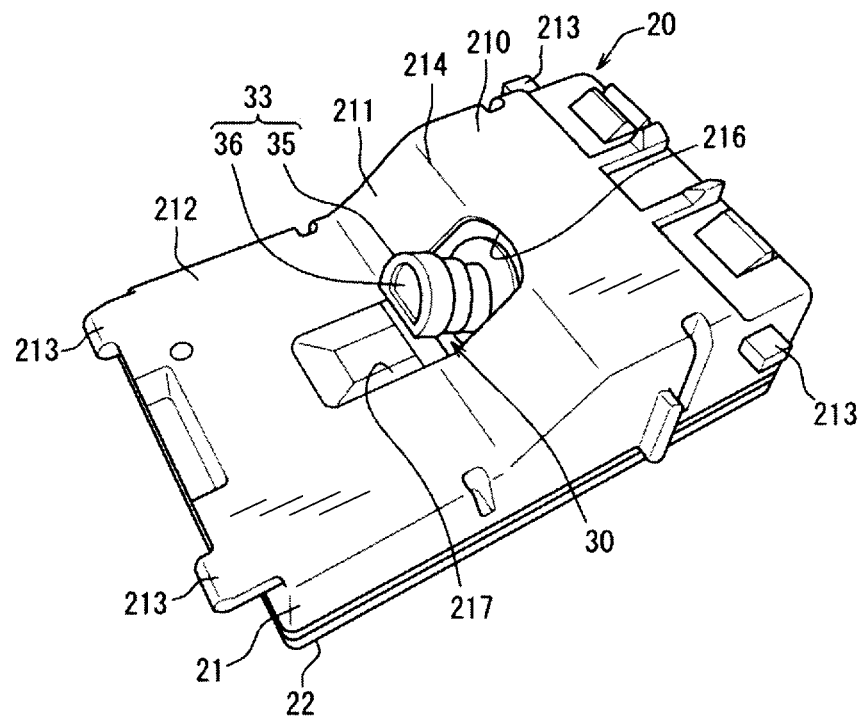
FIG. 10 is a perspective view which illustrates a camera casing according to the first embodiment.

The camera casing 20, as illustrated in FIGS. 7, 9, and 10, is made of an assembly of two casing members 21 and 22. Each of the casing members 21 and 22 is made of a hard material such as aluminum which has a high heat dissipating ability. The casing members 21 and 22 are attached to each other to define an inner chamber. The casing members 21 and 22 will also be referred to as an upper casing and a lower casing, respectively.

The upper casing member 21 which is of an inverse-cup shape is arranged below the bracket assembly 10 to have an opening facing downward, that is, away from the bracket assembly 10. The upper casing member 21 has a plurality of fitting protrusions 213 formed on an outer circumferential wall thereof. The bracket 11 has a plurality of fitting protrusions 61 one for each of the fitting protrusions 213. Each of the fitting protrusions 61 is attached to a corresponding one of the fitting protrusions 213, for example, in the form of a snap-fit, thereby securing the camera casing 20 to the inner surface of the front windshield 3 through the bracket assembly 10.

The upper casing member 21 includes an upper wall made up of the shield-facing wall 210, the curved wall 211, and the recessed wall 212. The shield-facing wall 210 is oriented to face the inner surface 3a of the front windshield 3 through the bracket assembly 10. The shield-facing wall 210 is, therefore, arranged as close to the front windshield 3 as possible.

The curved wall 211 is curved from the shield-facing wall 210. The curved wall 211 extends forward and downward from the shield-facing wall 210 to have the ridge 214 on a boundary between the curved wall 211 and the shield-facing wall 210. The ridge 214 extends over the entire width of the upper casing member 21 in the lateral direction and is arranged as close to the front windshield 3 as possible.

The recessed wall 212 is curved upward from a lower end of the curved wall 211. In other words, the recessed wall 212 extends forward and upward from the curved wall 211 so that it approaches the front windshield 3. This layout of the recessed wall 212 defines the storage chamber 215 between the recessed wall 212 and the front windshield 3 in which the hood 40 is disposed.

The lower casing member 22 is of a dished shape and arranged below the upper casing member 21 to have an upper opening facing the upper casing member 21. The lower casing member 22 is joined to the upper casing member 21 using screws to define the storage chamber 25 inside the assembly of the casing members 21 and 22 in which the imaging assembly 30 and the circuit unit 50 are disposed.

Figure 11:
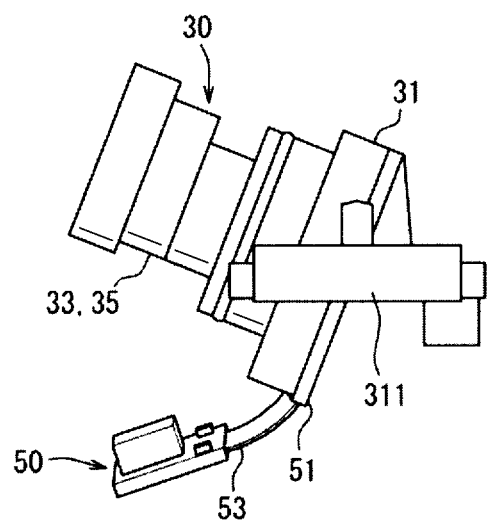
FIG. 11 is a side view which illustrates an image assembly and a circuit unit according to the first embodiment.
Figure 12:
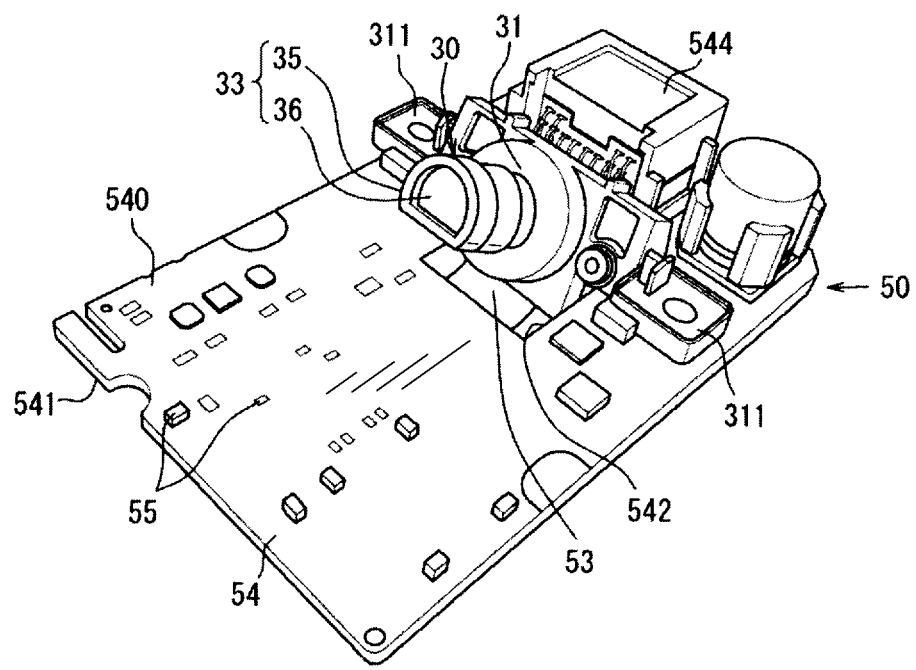
FIG. 12 is a perspective view which illustrates an image assembly and a circuit unit according to the first embodiment.

The imaging assembly 30, as clearly illustrated in FIGS. 7, 11, and 12, includes the assembly holder 31, the lens unit 33, and the imager 34. The assembly holder 31 is made of an easy-to-form hard material such as resin in the shape of a hollow block. The assembly holder 31 has defined therein the rear optical path chamber 310 which guides an optical image toward the imager 34 disposed therein. The assembly holder 31 has the right and left ends 311 fastened using screws to the upper casing member 21 arranged above the assembly holder 31.

The lens unit 33, as illustrated in FIGS. 7, 8, 10, 11, 12, and 14, includes the lens barrel 35 and the wide-angle lens 36. The lens barrel 35 is made of an easy-to-form hard material such as resin in the shape of a hollow cylinder as a whole. The lens barrel 35 defines therein the front optical path chamber 357 which guides an optical image outputted from the wide-angle lens 36 disposed therein. The lens barrel 35 is secured to a front end of the assembly holder 31 in direct contact therewith to achieve an optical communication between the front optical path chamber 357 and the rear optical path chamber 310.

The lens barrel 35, as clearly illustrated in FIGS. 7 and 10, has a front end portion exposed outside the camera casing 20 through the curved wall 211. Specifically, the curved wall 211 has formed therein the lens window 216 which passes through a thickness thereof. The lens window 216 is, as can be seen in FIG. 10, located in the center of the curved wall 211 in the width-wise direction thereof. The lens barrel 35 passes through the lens window 216 so that it is exposed outside the camera casing 20. The recessed wall 212 also has the recessed hole 217 formed in an upper surface thereof in the shape of a recess. The recessed hole 217 is located in the center of the recessed wall 212 in the width-wise direction thereof and communicates with the lens window 216. The wide-angle lens 36 is, as illustrated in FIGS. 7, 8, 10, and 14, made of a transparent material such as glass in the shape of a concave meniscus lens. The wide-angle lens 36 is fit in the front end of the lens barrel 35 to close the front end of the front optical path chamber 357. The optical axis Aw passing through the principal point $P_p$ of the wide-angle lens 36 slants forward upward or downward in the longitudinal direction. The optical axis Aw may alternatively be oriented parallel to the longitudinal direction.

The wide-angle lens 36 is engineered to offer a relatively wide angle of view, for example, 75° to 150° to achieve an intended angle of view of the whole of the lens unit 33, but may be designed to create a wider angle of view. The wide-angle lens 36 is designed to have an f-number more than or equal to two in order to ensure given scene brightness and optical resolution required by the lens unit 33 as a whole. In order to achieve the above angle of view and f-number, the focal length between the principal point $P_p$ and a focal point $P_f$ of the wide-angle lens 36 is selected to be relatively short, and the size of the wide-angle lens 36 is, as described later in detail, selected to be larger on an upper side of the optical axis Aw.

Figure 17:
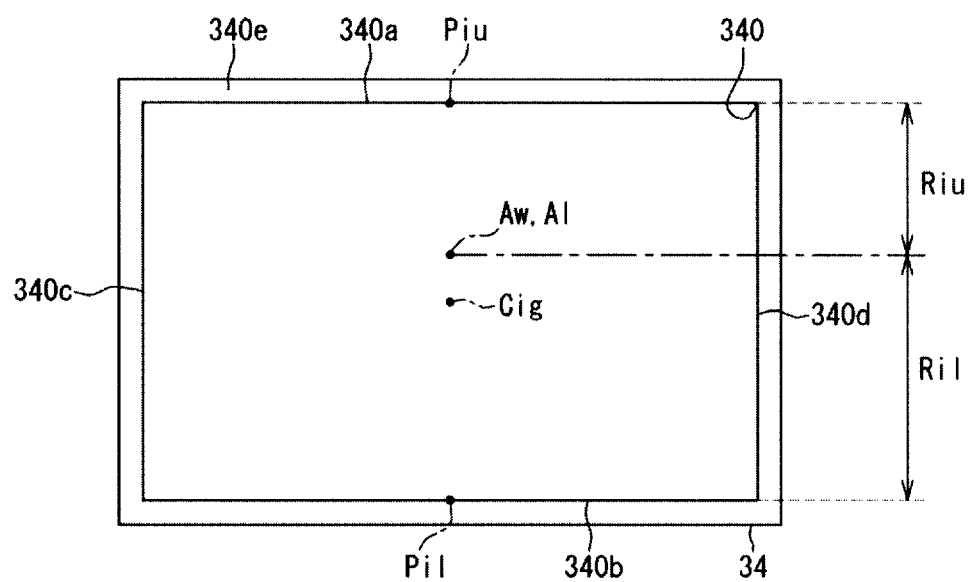
FIG. 17 is a front view which illustrates an imager according to the first embodiment.

The imager 34 shown in FIGS. 7 and 17 is implemented by a color or back-and-white image sensor such as a CCD or a CMOS. The imager 34 may have an infrared cut-off filter (not shown) mounted in front of the image sensor. The imager 34 is of a rectangular plate shape as a whole. The imager 34 is, as clearly illustrated in. FIG. 7, mounted in the assembly holder 31 so that it is arranged inside the rear optical path chamber 310. The focal point $P_f$ of the wide-angle lens 36 is set within the front optical path chamber 357, so that it is located in front of the imager 34.

With the above arrangements of the imaging assembly 30, light from the outside view 5 passing through the front windshield 3 enters the lens unit 33 with the wide-angle lens 36 to form an image in the imager 34. Specifically, an optical image, as produced by light coming from an image capturing range in the outside view 5, is formed as an inverted image in the imager 34 arranged in back of the focal point $P_f$ of the wide-angle lens 36. The imager 34 takes the inverted image to output data, as derived by imaging the outside view 5, in the form of an electrical signal.

The hood 40 is, as illustrated in FIGS. 7 and 8, formed integrally with the bracket 11 in resin molding. In other words, the hood 40 is made of a portion of the bracket assembly 10. As viewed from above the hood 40, an entire configuration thereof is of a disc shape symmetrical with respect to the optical axis Aw of the wide-angle lens 36 in the lateral direction. The hood 40 includes the base wall 41, the rear wall 42, and the side walls 43.

The base wall 41 is arranged above the recessed wall 212 and below the optical axis Aw in front of the curved wall 211. The base wall 41 is disposed in the storage chamber 215 between the recessed wall 212 and the front windshield 3. The base wall 41 extends forward in front of the curved wall 211 so as to close the distance to the front windshield 3. The base wall 41 is of a substantially flat trapezoidal shape and has the bottom surface 31a (i.e., an upper surface) facing the inner surface 3a of the front windshield 3 through the imaging space 410. An optical image in a given image capturing range where the imager 34 works to capture an image of the outside view 5 passes through the front windshield 3 and then is directed to the imaging space 410.

The base wall 41 has a plurality of optical block ribs 411 disposed thereon. The optical block ribs 411 protrude from the bottom surface 41a of the base wall 41 toward the front windshield 3, that is, the imaging space 410. Each of the optical block ribs 411 extends straight in the form of a convexity or ridge. Specifically, the optical block ribs 411 extend in the lateral direction and are arranged at a given interval away from each other in the longitudinal direction. Every adjacent two of the optical block ribs 411 have walls facing each other and work to achieve multiple reflection of light traveling to the base wall 41 between those walls, thereby trapping it. The height of each of the optical block ribs 411 from the base wall 41 is selected to be a given value achieving such optical trapping.

The rear wall 42 is so arranged as to have a width in the lateral direction whose center line coincides with the optical axis Aw. The rear wall 42 extends upward from a rear edge of the base wall 41. The rear wall 42 has the width broadening to face the curved wall 211 located beneath the rear wall 41. The rear wall 42 is inclined backward relative to the base wall 41 so as to approach the front windshield 3.

The rear wall 42 has formed therein the lens window 420 which passes through a thickness thereof. The lens window 420 is located in the center of the width of the rear wall 42. The front end portion of the lens barrel 35 in which the wide-angle lens 36 is mounted passes through the lens window 216 and the lens window 420 and is exposed to the imaging space 410 above the base wall 41. The optical image of the outside view 5 in the image capturing range entering the imaging space 410 is, therefore, transmitted into the lens unit 33 equipped with the wide-angle lens 36.

At least one (which will also be referred to below as the specific rib 411a) of the optical block ribs 411 which is located near the front portion of the lens barrel 35 exposed outside the lens window 420, as can be seen in FIG. 7, has a larger height from the surface of the base wall 41 than those of the other optical block ribs 411 arranged in front of the lens barrel 35. In other words, the specific rib 411a that is at least one of the optical block ribs 411 located around or near the wide-angle lens 36 protrudes upward from the base wall 41 to have a larger height than those of the other optical block ribs 411. FIGS. 7 and 8 demonstrate some of the optical block ribs 411 which are shaped as specific ribs 411a having heights larger than those of the other optical block ribs 411. The heights of the specific ribs 411a gradually increase toward the wide-angle lens 36 of the lens unit 33.

The base wall 41 has the incident ray hole 421 formed in the center of the width of the bottom surface 41a in the lateral direction. The incident ray hole 421 is of a recessed shape and located near the exposed front portion of the lens barrel 35 to communicate with the lens window 420. The recessed hole 217 formed in the recessed wall 212 is shaped to avoid physical interference with the incident ray hole 421. The incident ray hole 421 is formed to have a depth large enough to permit the optical image of the outside view 5 within the whole of the image capturing range to enter the lens unit 33.

The side walls 43 are arranged symmetrically with respect to the optical axis Aw in the lateral direction, so that they are located on opposite sides of the imaging space 410 in the lateral direction. The side walls 43 extend upward from right and left side edges of the base wall 41. Each of the side walls 43 is substantially perpendicular to the bottom surface 41a of the base wall 41, in other words, extends in the vertical direction. Each of the side walls 43 has the trapezoidal flat inner surface 43a. The interval between the inner surfaces 43a of the right and left side walls 43 in the lateral direction gradually increases toward the front of the base wall 41. Each of the side walls 43 has a height from the base wall 41 which decreases toward the front of the base wall 41, thereby creating, as clearly illustrated in FIG. 7, the air gap 430 between each of the side walls 43 and the inner surface 3a of the front windshield 3. The air gaps 430 extend over the whole of the camera module 1 in the longitudinal direction.

The hood 40 which has the above described structure serves to block input of unwanted light from outside the image capturing range in the outside view 5 into the lens unit 33. For instance, the hood 40 blocks or minimizes the entry of light reflected by the inner surface 3a of the front windshield 3 into the lens unit 33. The hood 40 also blocks light which is trapped by the optical block ribs 411 and then reflected on the base wall 41 into the lens unit 33.

The circuit unit 50 is, as illustrated in FIGS. 7, 11, and 12, positioned inside the storage chamber 25 along with the components 31, 33, and 34 of the imaging assembly 30. The circuit unit 50 is made of an assembly of substrates 51, 53, and 54 and circuits 52 and 55.

The substrate 51 is, as illustrated in FIGS. 7 and 11, an imaging substrate made of a rigid board, such as a glass epoxy board, and of a substantially rectangular flat plate. The imaging substrate 51 is secured to the assembly holder 31 using screws to close the rear of the rear optical path chamber 310.

The imaging substrate 51 has the front mount surface 510 and the rear mount surface 511 which are opposed to each other through a thickness thereof. The front mount chamber 510 is exposed to the rear optical path chamber 310. The rear mount surface 511 is exposed to the storage chamber 25. The front mount surface 510 has the imager 34 mounted thereon. The front and rear mount surfaces 510 and 511 have mounted thereon a plurality of circuit components which make up the imaging circuit 52. The imaging circuit 52 achieves transmission of signals or data between itself and the imager 34.

The flexible substrate 53 shown in FIGS. 7, 11, and 12 is made of, for example, an FPC (flexible printed circuit) board. Specifically, the flexible substrate 53 is made of a resinous flexible base film and conductors mounted thereon and of a substantially rectangular shape. The flexible substrate 53 is connected at an end thereof to a lower end of the imaging substrate 51.

The control substrate 54 shown in FIGS. 7 and 12 is a rigid board, such as a glass epoxy hoard. The control substrate 54 is in the shape of a substantially rectangular plate. The control substrate 54 has an upper and a lower surface opposed to each other through a thickness thereof. The upper surface faces upward in the storage chamber 25, while the lower surface faces downward in the storage chamber 25. Specifically, the control substrate 54 has the upper mount surface 540 facing upward and the lower mount surface 541 facing downward. The control substrate 54 has an outer peripheral edge thereof and the upper mount surface 540 which are placed at a plurality of locations in contact with the upper casing member 21. The lower mount surface 541 is placed at a plurality of locations in contact with the lower casing member 22. This positions the control substrate 54 between the casing members 21 and 22.

The control substrate 54 has the connecting hole 542 passing through the center of the width thereof and opening at the upper and lower mount surfaces 540 and 541. The connecting hole 542 is of a substantially rectangular shape and has the imaging substrate 51 and the assembly holder 31 partially passing therethrough. In other words, the imaging substrate 51 and the assembly holder 31 are arranged on both upper and lower sides of the control substrate 54. A portion of the imaging substrate 51 on which the imager 34 is mounted (which will also be referred to below as a mounted portion) is located at least above the control substrate 54. In this embodiment, the mounted portion of the imaging substrate 51 is disposed is located above the control substrate 54. The mounted portion may have a lower end within, above, or below the connecting hole 542.

The mount surfaces 540 and 541, as illustrated in FIGS. 7 and 12, have a plurality of circuit components making up the control circuit 55. The upper mount surface 540 has disposed thereon the external connector 544 exposed outside the camera casing 20. The external connector 544 is connected to an external circuit arranged outside the camera casing 20.

The lower mount surface 541, as illustrated in FIG. 7, has disposed thereon the internal connector 543 exposed to the storage chamber 25. The internal connector 543 is connected to an end of the flexible substrate 53 located below the control substrate 54, so that the control substrate 54 is connected to the imaging substrate 51 through the flexible substrate 53 to achieve transmission of signals or data between the control circuit 55 and the imaging circuit 52.

Figure 13:
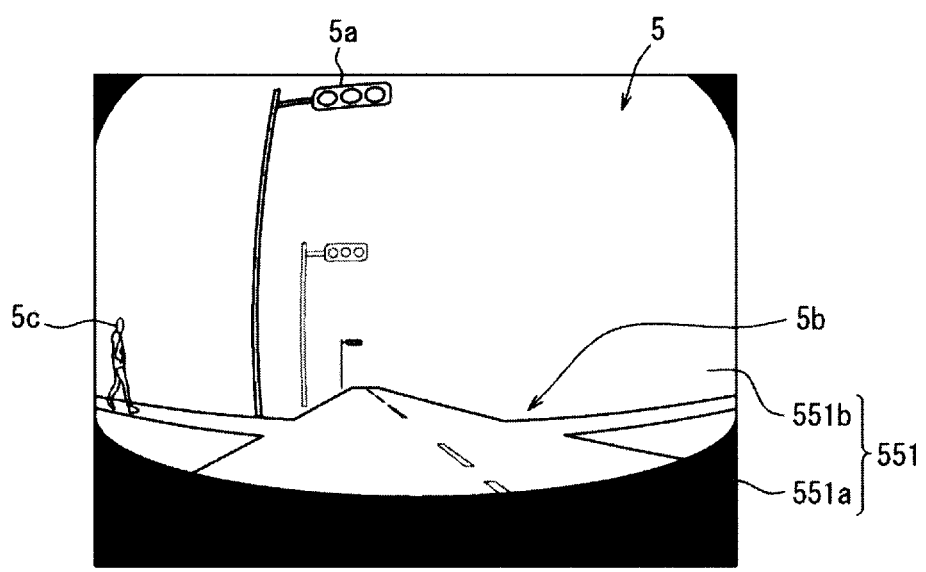
FIG. 13 is a schematic front view which illustrates an outside view formed using an apparatus of the first embodiment.

The control circuit 55 has the microcomputer 550 mounted on the lower mount surface 541 as one of the circuit components. The microcomputer 550 includes a processor. The control circuit 55 works to process an image outputted from the imager 34 along with the imaging circuit 52 to produce the outside image 551 illustrated in FIG. 13. The outside image 551 in which a structural object and/or an obstacle can be identified within the image capturing range is produced. The image capturing range is so selected that when the vehicle 2 has approached the traffic light 5a as a structural object above a roof panel of the vehicle 2, an image of the traffic light 5a can be identified in the outside image 551. The image capturing range is also so selected that when the front bumper of the vehicle 2 has approached the intersection 5b, an image of the front obstacle 5c, such as a pedestrian, a bicycle, or an automobile), entering the intersection 5b can be identified.

The control circuit 55 works to control imaging operations of the imager 34 including an exposure operation when the imager 34 takes an image along with the imaging circuit 52. The control circuit 55 determines a range of effective pixels 551b, as demonstrated in FIG. 13, which is derived by removing from the outside image 551 produced by the image processing operations a range of the vehicle-image pixels 551a which is a lower portion of the outside image 551 and where a portion of the vehicle 2 (e.g., a bonnet or hood) appears in the outside image 551. The control circuit 55 controls the exposure used to capture an image next time as a function of pixel values of the effective pixels 551b in a given range. The pixel value used in such exposure control may be a gradation of only one or some of the effective pixels 551b.

The control circuit 55 may be designed to perform an image recognition operation to identify a structural object or an obstacle appearing within the image capturing range on the outside image 551 in addition to the above described image processing operation and imaging control operation. Either of the control circuit 55 or the imaging circuit 52 may be engineered to perform only one of the image processing operation and the imaging control operation.

The control substrate 54 in the first embodiment corresponds to the wiring substrate 140 illustrated in FIGS. 2 to 5. The control circuit 55 corresponds to the ECU 110 shown in FIG. 2. The external connector 544 corresponds to the substrate-side connector 130 shown in FIGS. 2 to 4.

The structure of the lens unit 33 will be described below in detail.

Figure 14:
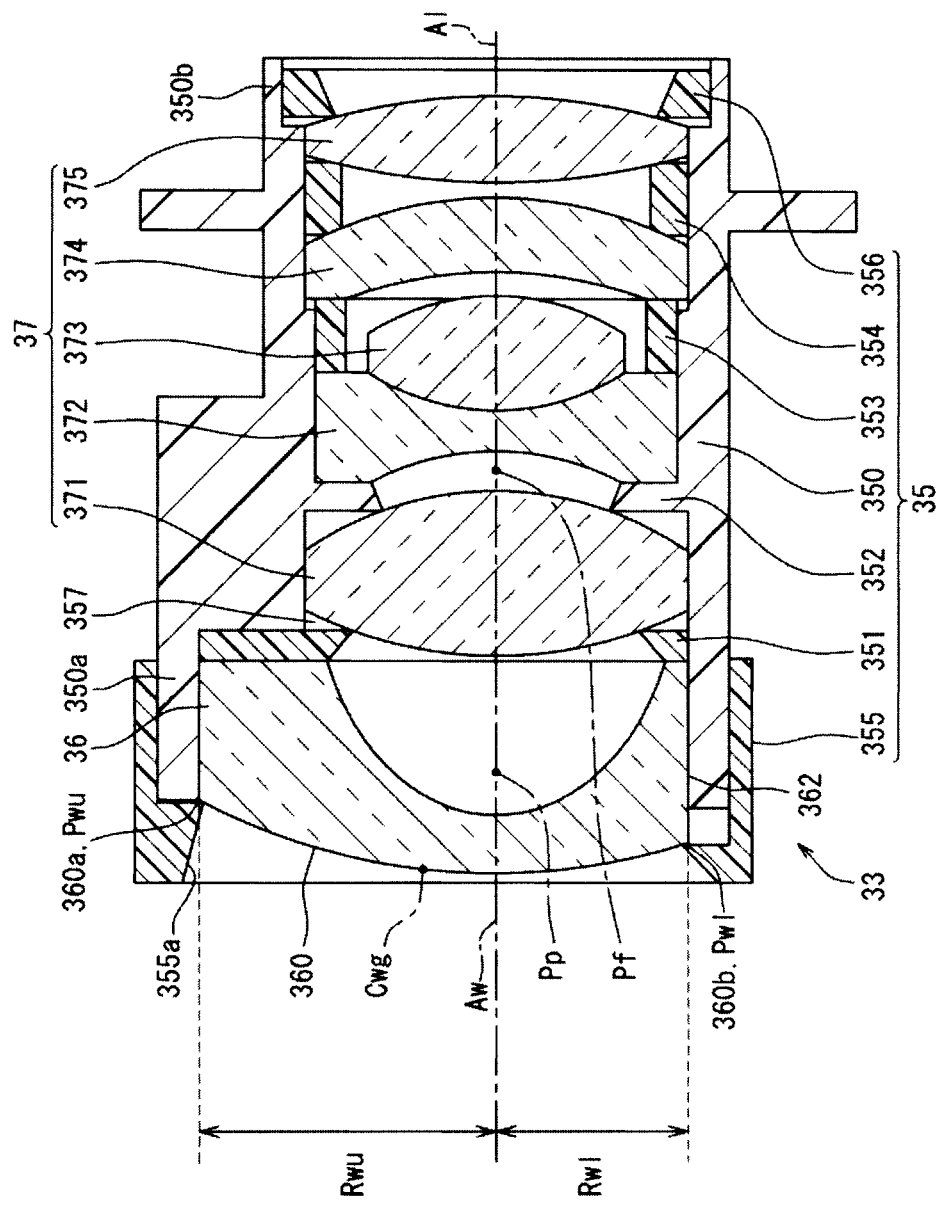
FIG. 14 is a sectional view which illustrates a lens unit according to the first embodiment.

The lens unit 33, as clearly illustrated in FIG. 14, includes the lens set 37 disposed optically downstream or in back of the wide-angle lens 36 in the lens barrel 35. In other words, the wide-angle lens 36 is located optically upstream or in front of the lens set 37, that is, closer to the outside view 5 than the lens set 37 is within the lens barrel 35 of the lens unit 33.

The lens set 37 includes a plurality of rear lenses 371, 372, 373, 374, and 375 which are aligned in the longitudinal direction and works to exert an optical effect, such as chromatic aberration reduction, to an optical image optically processed by the wide-angle lens 36. Each of the rear lenses 371, 372, 373, 374, and 375 has opposed optical surfaces including either or both of an aspherical surface and a spherical surface. The rear lenses 371, 372, 373, 374, and 375 are arranged to have the common optical axis Al that is an optical axis of the lens set 37. The optical axis Al is aligned with the optical axis Aw of the wide-angle lens 36, so that the optical axis Aw of the wide-angle lens 36 and the optical axis Al of the lens set 37 pass through the principal point P of the wide-angle lens 36.

Specifically, the first rear lens 371 that is located at the front of the lens set 37 is made of a transparent material such as glass in the form of a double-convex lens. The first rear lens 371 is located at a given distance behind the wide-angle lens 36. The second rear lens 372 that is in the second from the front is made of a transparent material such as glass in the form of a double-concave lens. The second rear lens 372 is located at a given distance behind the first rear lens 371. The third rear lens 373 that is in the third from the front is made of a transparent material such as glass in the form of a double-convex lens placed on a rear optical surface of the second rear lens 372. The fourth rear lens 374 that is the fourth from the front is made of a transparent material such as glass in the form of a convex meniscus lens. The fourth rear lens 374 is located at a given distance behind the third rear lens 373. The fifth rear lens 375 that the fifth lens from the front is made of a transparent material such as glass in the form of a double-convex lens. The fifth rear lens 375 is located at a given distance behind the fourth rear lens 374.

Figure 15:
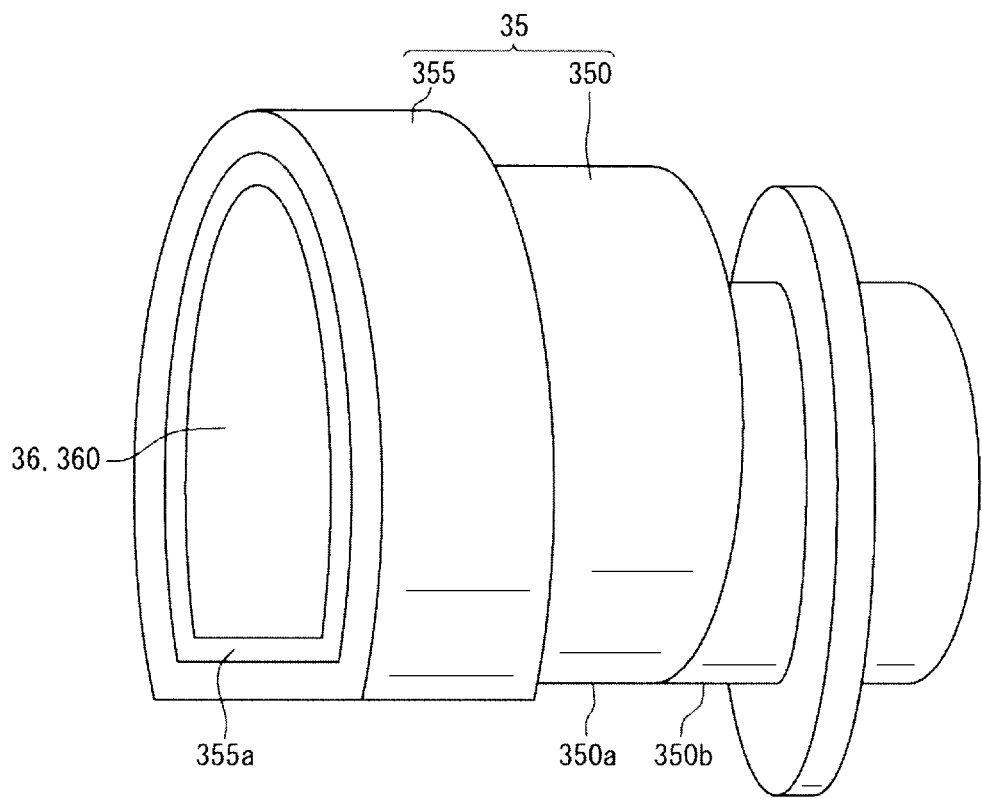
FIG. 15 is a perspective view which illustrates a lens unit according to the first embodiment.
Figure 16:
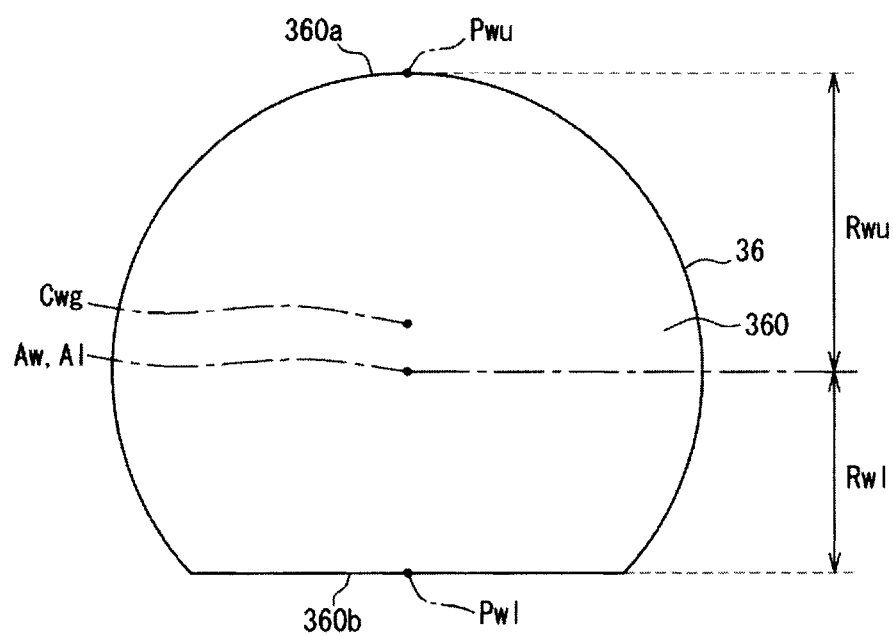
FIG. 16 is a front view which illustrates a wide-angle lens according to the first embodiment.

The wide-angle lens 36, as illustrated in FIGS. 14, 15, and 16 has the wide-angle optical surface 360 which faces the outside view 5 away from the rear lenses 371, 372, 373, 374, and 375. The wide-angle optical surface 360 is spherical or aspherical. In other words, the front optical surface of the wide-angle lens 36 forms the wide-angle optical surface 360. The wide-angle optical surface 360, as clearly illustrated in FIGS. 14 and 16, has a lower portion that is located below the optical axes Aw and Al of the wide-angle lens 36 and the lens set 37 and is cut to be flat, as can be seen in FIG. 16. When viewed from the front, the outer profile of the wide-angle optical surface 360 is of a partial circular shape with the convex circular arc 360a and the straight chord 360b extending between edges of the circular arc 360a. The circular arc 360a is defined by a segment of a complete circle from which the cut lower portion of the wide-angle optical surface 360 is removed. The chord 360b defined by the cut portion of the wide-angle optical surface 360 which is located below the optical axes Aw and Al extends straight the lateral direction between the right and left edges of the circular arc 360a having a constant curvature. The lower portion (i.e., the chord 360b) of the wide-angle optical surface 360 may be formed using cutting or molding techniques.

The wide-angle optical surface 360 has the lowermost point Pwl at the center of the chord 360b and the uppermost point Pwu at the center of the circular arc 360a. When viewing a projection of the wide-angle optical surface 360 from the front thereof, the lowermost point Pwl and the uppermost point Pwu are symmetrical about the geometrical center Cwg of the wide-angle optical surface 360 in the vertical direction. In other words, as viewed from the front, the geometrical center Cwg of the wide-angle optical surface 360 is defined at a point equidistant from the lowermost point Pwl and the uppermost point Pwu of the wide-angle optical surface 360 on a line segment defined to extend straight between the lowermost point Pwl and the uppermost point Pwu.

The geometrical center Cwg of the wide-angle optical surface 360 is, therefore, offset above the optical axes Aw and Al of the wide-angle lens 36 and the lens set 37. The wide-angle optical surface 360, thus, has an upper portion which is located above the optical axes Aw and Al and greater in size than a lower portion located below the optical axes Aw and Al. In other words, the wide-angle optical surface 360 has the upper size Rum and the lower size Rwl. The upper size Runt is defined by a distance (i.e., a radius of the circular arc 360a) between the optical axes Aw and Al and the uppermost point Pwu on the optical surface 360. The lower size Rwl is defined by a distance between the optical axes Aw and Al and the lowermost point Pwl on the optical surface 360. The upper size Rwu is greater than the lower size Rwl.

The lens barrel 35, as illustrated in FIGS. 14 and 15, includes the barrel body 350, the spacers 351, 352, 353, and 354, and the caps 355 and 356. The barrel body 350 is made of an easy-to-form hard material such as resin. The barrel body 350 has two storage housings 350a and 350b (which will also be referred to below a wide-angle chamber and a rear chamber, respectively) which define the front optical path chamber 357. Specifically, an inner profile of the wide-angle housing 350a is, as illustrated in FIG. 14, in the shape of a partially cylindrical hole contoured to conform with an outer profile of the wide-angle optical surface 360. The wide angle housing 350a has the outer circumferential surface 362 of the wide-angle lens 36 fitted into the front thereof.

The inner profile of the rear housing 350b is contoured to conform with the outer profile of the rear lens 371, 372, 374, and 375. The first rear lens 371 is fitted into the rear housing 350b from the front thereof. A pre-assembly of the second and third lenses 372 and 373, and the fourth lens 374 and the fifth lens 375 are fitted into the rear housing 350b from the rear thereof.

The first spacer 351 is made of an easy-to-form hard material such as resin in the shape of an annular plate which has a partial circular outer profile and a cylindrical hole-shaped inner profile. The first spacer 351 is fitted into the wide angle housing 350a from the front thereof. The first spacer 351 retains the back of the wide-angle lens 36 and also retains the front of the first rear lens 371. The second spacer 352 is molded using, for example, resin integrally with the rear housing 350b in a circular or annular shape. The second spacer 352 engages the back of the first rear lens 371 to hold the first rear lens 371 between itself and the first spacer 351. The second spacer 352 also engages the front of the second rear lens 372.

The third and fourth spacers 353 and 354 are made of an easy-to-form hard material such as resin in a hollow cylindrical shape. The third and fourth spacers 353 and 354 are fitted into the rear housing 350b from the back thereof. The third spacer 353 engages the back of the second rear lens 272 to hold the second rear lens 272 between itself and the second spacer 352 and also retains the front of the fourth rear lens 374. The fourth spacer 354 engages the back of the fourth rear lens 374 to hold the fourth rear lens 374 between itself and the third spacer 353 and also engages the front of the fifth rear lens 375.

The front cap 355 is, as illustrated in FIGS. 14 and 15, made of, for example, an easy-to-form hard material such as resin in the shape of an annular plate which has partial circular outer and inner profiles. The front cap 355 is fit on the front of the wide angle housing 350a. It is advisable that the front cap 355 be adhered to the wide angle housing 350a. The front cap 355 engages the front of the wide-angle lens 36 to hold the wide-angle lens 36 between itself and the first spacer 351.

The front cap 355 has the barb or claw-shaped hook 355a which retains the wide-angle optical surface 360 of the wide-angle lens 36. The hook 355a is molded with, for example, resin in a partially annular shape before the front cap 355 is fitted on the wide angle housing 350a. In the first embodiment, a portion of the wide-angle lens 36 the hold 355a engages extends in a circumferential direction of the outer profile of the wide-angle optical surface 360 and is gradually offset backward from the lowermost point Pwl of the chord 360b toward the uppermost point Pwu of the circular arc 360a.

The rear cap 356 is, as illustrated in FIG. 14, made of, for example, an easy-to-form hard material such as resin in an annular shape. The rear cap 356 is fitted in the back of the rear housing 350b. It is advisable that the rear cap 356 be screwed into or adhered to the back of the rear housing 350b. The rear cap 356 engages the back of the fifth rear lens 375 to retain the fifth rear lens 375 between itself and the fourth spacer 354.

The thus constructed lens unit 33 is capable of making breathing (e.g., air purging) between the front optical path chamber 357 of the barrel body 350 and the outside through clearances between each of the storage housings 350a and 350b with the components disposed in the storage housings 350a and 350b.

The structure of the imager 34 will be described below in detail.

The imager 34 shown in FIG. 7 is designed to have an effective imaging range 340 demonstrated in FIG. 17 where the imager 34 is capable of capturing an inverted image of an optical image formed through the wide-angle lens 36 and the lens set 37. Specifically, the effective imaging range 340 is defined by an area of a plane in an outline of the front of the imager 34 where the imager 34 is sensitive to light of the outside view 5 passing through the wide-angle lens 36 and the lens set 37. The effective imaging range 340 is also defined on the front surface 340e of the imager 34 which extends substantially perpendicular to the optical axes Aw and Al of the wide-angle lens 36 and the lens set 37 and surrounds the optical axes Au) and Al. The outline of the effective imaging range 340, as viewed from the front of the imager 34, is therefore of a rectangular shape having four sides: the upper and lower sides 340a and 340b and right and left sides 340c and 340d. The upper and lower sides 340a and 340b extend substantially in the lateral direction, while the right and left sides 340c and 340d extend straight substantially in the vertical direction or slightly incline frontward or backward from lower to upper portions thereof.

The effective imaging range 340 has the lowermost point Pil and the uppermost point Piu. The lowermost point Pil is defined at the middle of the lower side 340b. The uppermost point Piu is defined at the middle of the upper side 340a. The lowermost point Pil and the uppermost point Piu are symmetrical about the geometrical center Cig of the effective imaging range 340 in the vertical direction, as viewed from the front of the imager 34. In other words, as viewed from the front, the geometrical center Cig of the effective imaging range 340 is defined at a point equidistant from the lowermost point Pit and the uppermost point Piu on a line segment defined to extend straight between the lowermost point and the uppermost point Piu.

The geometrical center Cig of the effective imaging range 340 is, therefore, offset below the optical axes Aw and Al of the wide-angle lens 36 and the lens set 37, so that it has an upper portion above the optical axes Aw and Al and a lower portion below the optical axes Aw and Al. The upper portion has the size Riu smaller than the size Ril of the lower portion. Specifically, the upper size Riu is defined by a distance between the optical axes Aw and Al and the uppermost point Piu in the effective imaging range 340. The lower size Ril is defined by a distance between the optical axes Aw and Al and the lowermost point Pil in the effective imaging range 340.

The first embodiment offers the following beneficial advantages.

The lens unit 33 has the wide-angle lens 36 which forms an optical image of the outside view 5 of the vehicle 2 on the imager 34 and is located close to the outside view 5. The wide-angle optical surface 360 has the upper size above the optical axis Aw of the wide-angle lens 36 and the lower size below the optical axis Aw of the wide-angle lens 36. The upper size is greater than the lower size. Additionally, the size of the wide-angle optical surface 360 is also set to be greater above the optical axis Al of the rear lens set 37 (i.e., the optical axes of the rear lenses 371, 372, 373, 374, and 375) passing through the principal point $P_p$ of the wide-angle lens 36 than below the optical axis A1. In other words, an upper portion of the wide-angle optical surface 360 which is located above the optical axes Au) and Al where the vehicle 2 is hardly imaged has a size larger than that of a lower portion of the wide-angle optical surface 360 which is located below the optical axes Aw and Al where the vehicle 2 is usually imaged. The large-sized upper portion of the wide-angle optical surface 360, therefore, works to form a recognizable image of an upper portion of the outside view 5 above the vehicle 2. The lower portion of the wide-angle optical surface 360 where the image capturing range of the outside view 5 is blocked or narrowed by the vehicle 2 is smaller in size than the upper portion thereof, but is capable of forming a required image in the image capturing range limited by the vehicle 2. This enables the overall size of the camera module 1 to be reduced.

The wide-angle lens 36 of the lens unit 33 which forms an optical image of the outside view 5 of the vehicle 2 on the imager 34 has the wide-angle optical surface 360 facing the outside view 5. The wide-angle optical surface 360 is shaped to have the geometrical center Cwg offset above the optical axis Aw of the wide-angle lens 36. Additionally, the geometrical center Cwg of the wide-angle optical surface 360 is also offset above the optical axis Al of the lens set 37 (i.e., the optical axis of the rear lenses 371, 372, 373, 374, and 375) passing through the principal point. $P_p$ of the wide-angle lens 36. In other words, the geometrical center Cwg of the wide-angle optical surface 360 is located above the optical axes Aw and Al where the vehicle 2 is hardly imaged, but below the optical axes Aw and Al where the vehicle 2 is usually imaged. The upper portion of the wide-angle optical surface 360 which has the size larger than that of the lower portion thereof depending upon the offset of the geometrical center Cwg is, therefore, capable of forming a recognizable image of the outside view 2 in a range above the vehicle 2.

The lower portion of the wide-angle optical surface 360 where the image capturing range of the outside view 5 is blocked or narrowed by the vehicle 2 is smaller in size than the upper portion thereof depending upon the offset of the geometrical center Cwg, but is capable of forming a required image in the image capturing rang limited by the vehicle 2. This enables the overall size of the camera module 1 to be reduced.

The imager 34 is, as described above, designed to have the effective imaging range 340 where the imager 34 is capable of capturing an inverted image of an optical image of the outside view 5 of the vehicle. The effective imaging range 340 has the upper portion above the optical axis Aw of the wide-angle lens 36 and the lower portion below the optical axis Aw. The lower portion is greater in size than the upper portion. Additionally, the size of the effective imaging range 340 is also set to be greater below the optical axis Al of the rear lens set 37 (i.e, the optical axes of the rear lenses 371, 372, 373, 374, and 375) passing through the principal point $P_p$ of the wide-angle lens 36 than above the optical axis A1. The large-sized lower portion of the effective imaging range 340 ensures a portion of the effective imaging range 340 where an inverted image of a portion of the outside view 5 above the vehicle 2 is formed, thereby making an image-capturing range of the imager 34 above the vehicle 2 as large as possible.

The imager 34 is, as described above, designed to have the geometrical center Cig of the effective imaging range 340 where an inverted image of an optical image of the outside view 5 of the vehicle 2 is formed. The geometrical center Cig is offset below the optical axis Aw of the wide-angle lens 36. Additionally, the geometrical center Cig is also offset below the optical axis Al of the rear lens set 37 (i.e., the optical axes of the rear lenses 371, 372, 373, 374, and 375) passing through the principal point $P_p$ of the wide-angle lens 36. The lower portion of the effective imaging range 340 which is larger in size than the upper portion thereof depending upon the offset of the geometrical center Gig, therefore, ensures a desired area of a portion of the effective imaging range 340 where an inverted image of a portion of the outside view 5 above the vehicle 2 is formed, thereby making the image-capturing range of the imager 34 above the vehicle 2 as large as possible.

The wide-angle optical surface 360 of the wide-angle lens 36 which has a cut portion located below the principal point $P_p$ is shaped to have a size above the principal point $P_p$ which is larger than that below the principal point $P_p$, thereby enabling the wide-angle lens 36 capable of capturing an recognizable image of the outside view 5 above the vehicle 2 to be produced to have a compact size.

The camera casing 20 has the lens unit 33 and the imager 34 disposed therein. The wide-angle optical surface 360 in the lens unit 33 is, as described above, shaped to have the lower portion smaller in size than the upper portion. This enables the size of the camera casing 20 to be minimized without sacrificing the space required to store the imager 34.

The control unit 50 which has control circuit 55 mounted on the control substrate 54 to control the operation of the imager 34 is disposed in the camera casing 20 together with the lens unit 33 and the imager 34. The wide-angle optical surface 360 in the lens unit 33 is, as described above, shaped to have the lower portion smaller in size than the upper portion. This enables the size of the camera casing 20 to be minimized without sacrificing the space required to store the circuit unit 50 as well as the imager 34.

The control circuit 55, as described above, determines the range of effective pixels 551b which is derived by removing the range of the vehicle-image pixels 551a from the outside image 551 produced by the image processing operations. The control circuit 55 controls the exposure in the imager 34 used to capture an image next time as a function of pixel values of the effective pixels 551b. In other words, the control circuit 55 determines the exposure using the pixel values of the effective pixels 551b well responsive to the brightness of the outside view 5 because the vehicle 2 is not imaged on the effective pixels 551b, thereby ensuring a degree of the exposure suitable for recognizing an image of a portion of the outside view 5 above the vehicle 2.

The circuit unit 50 has the imaging substrate 51 on which the imager 34 is disposed and the control substrate 54 on which the control circuit 55 is fabricated. The imaging substrate 51 and the control substrate 54 are connected using the flexible substrate 53 which absorbs manufacturing tolerances thereof and arranged in place inside the camera casing 20. The imaging substrate 51 on which the imager 34 is mounted at least above the control substrate 54 is arranged to extend both above and below the control substrate 54, thereby enabling the size of space required to install the circuit unit 50 to be decreased in the vertical direction.

The camera casing 20 has the curved wall 211 which is curved relative to the shield-facing wall 210 which faces the front windshield 3. The curved wall 211 is inclined to have a varying interval between itself and the front windshield 3 which increases with an increase in distance from the shield-facing wall 210. This enables the camera casing 20 to be secured to the inner surface of the front windshield 3 with the ridge 214 on the boundary between the shield-facing wall 210 and the curved wall 211 through which the lens unit 33 is exposed outside the camera casing 20 being located close to the front windshield 3. This enables an optical path from the outside view 5 to the lens unit 33 to be created between the curved wall 211 and the front windshield 3 as well as ensuring a desired range of view of occupants in the vehicle 2 to visually perceive the outside view 5.

The hood 40 serves to block light of the outside view 5 which is transmitted from outside the image capturing range of the imager 5 into the lens unit 33, thereby preventing unwanted light from entering the lens unit 33 in which a field of view is widened by the wide-angle lens 36 and being added to an optical image of light transmitted from inside the image capturing range.

The base wall 41 of the hood 40 is arranged to face the front windshield 3 and has disposed thereon a plurality of optical block ribs 411 which protrude toward the front windshield 3, thereby minimizing entry of reflected light into the lens unit 33. This prevents light which is reflected on the base wall 41 which faces the front windshield 3, so that more light enters the base wall 41 from being added to an optical image of light transmitted from inside the image capturing range.

The hood 40 is equipped with the specific rib 411a that is at least one of the optical block ribs 411 and located near the lens barrel 35. The specific rib 411a has a larger height from the surface of the base wall 41 and works to block light which is reflected on the base wall 41 and transmitted to the wide-angle lens 36. This prevents unwanted light from entering the lens unit 33 in which a field of view is widened by the wide-angle lens 36 and being added to an optical image of light transmitted from inside the image capturing range.

The communication system 100 works to transmit an image, as captured by the camera module 1 designed as an in-vehicle camera installed in one of the ECUs 110, to the other ECUs 110. This facilitates the ease with which, for example, an autonomous driving ECU uses an image captured by the camera module 1 to assist an operator in driving a vehicle.

C. In-Vehicle Camera in Second Embodiment

Figure 18:
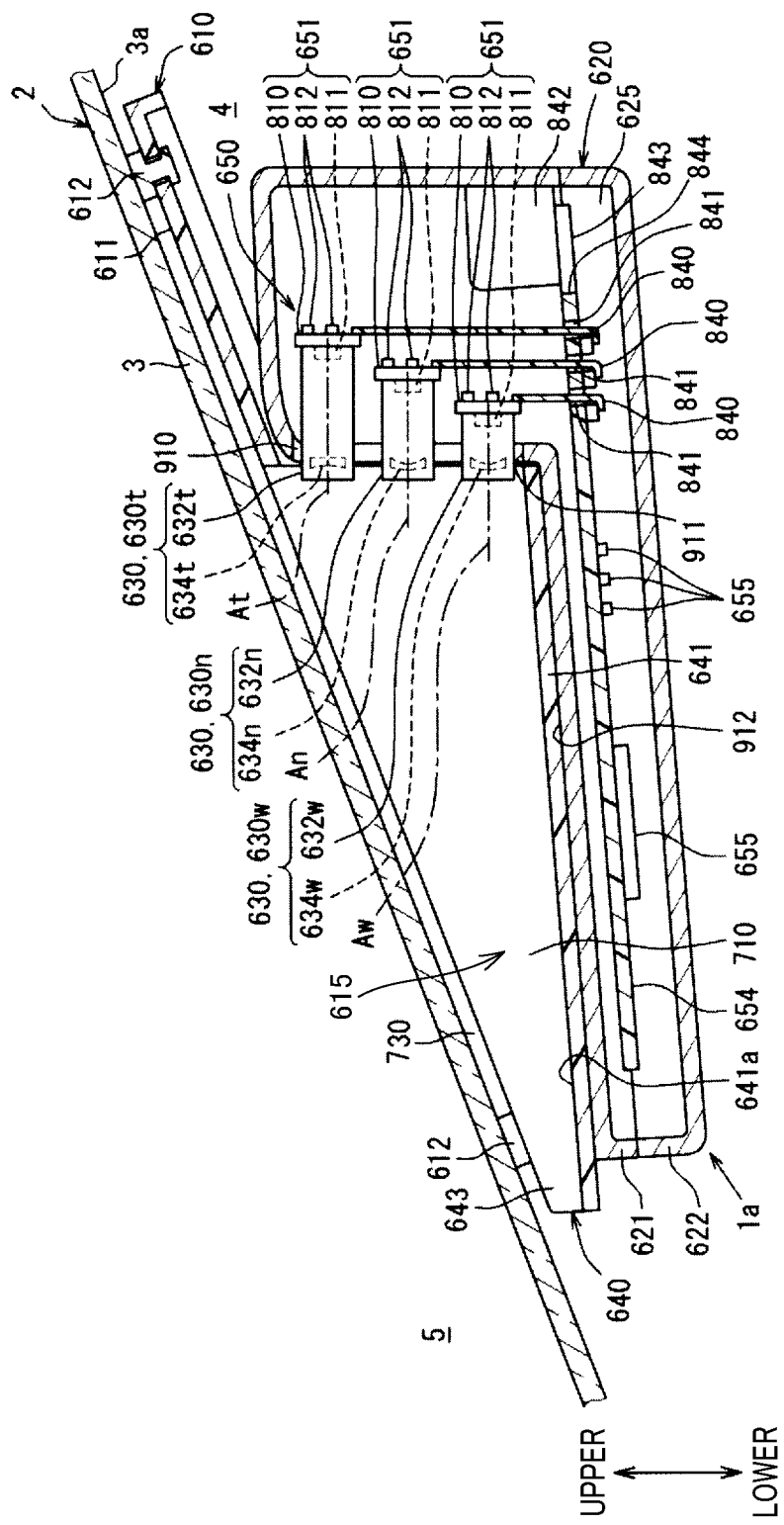
FIG. 18 is a sectional view, as taken along the line in FIG. 21, which illustrates a camera module according to the second embodiment.
Figure 19:
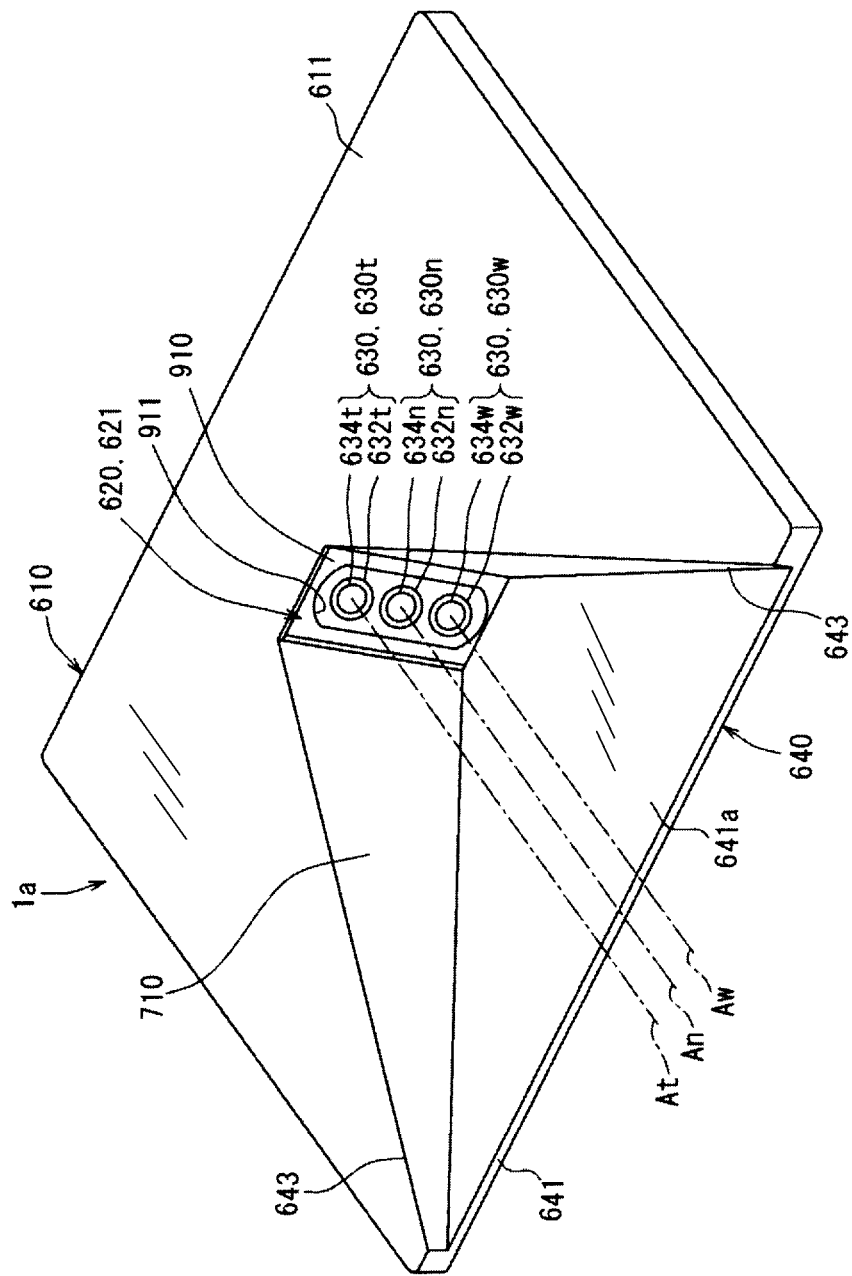
FIG. 19 is a perspective view which illustrates a camera module according to the second embodiment.

FIGS. 18 and 19 illustrate the camera module 1a that is an in-vehicle camera according to the second embodiment.

The camera module 1a is equipped with the bracket assembly 610, the camera casing 620, a plurality of lens units 630, the hood 640, and the imaging system 650, FIG. 19 omits some component parts of the camera unit 1a for the sake of convenience.

The bracket assembly 610 includes the bracket 611 and the attachment pads 612. The bracket 611 is made of an easy-to-form hard material such as resin in the shape of a flat plate. The bracket 611 extends along the inner surface 3a of the front windshield. 3. The bracket 611, as illustrated in FIG. 18, has a plurality of attachment pads 612 fit therein. Each of the attachment pads 612 is adhered to the inner surface 3a of the front windshield 3, thereby securing the camera module 1a with the bracket assembly 610 to the front windshield 3 in place relative to the vehicle 2.

The camera casing 620 is made of an assembly of two casing members 621 and 622. Each of the casing members 621 and 622 is made of a hard material such as aluminum which has a high heat dissipating ability and formed in a hollow shape.

The upper casing member 21 which is of an inverse-cup shape is arranged below the bracket assembly 610 to have an opening facing downward, that is, away from the bracket assembly 610. The upper casing member 621 is fit on the bracket 611 to position the camera casing 620 inside the front windshield 3 through the bracket assembly 610. This layout defines the storage chamber 212 in which the hood 640 is disposed between the upper casing member 621 and the front windshield 3

The lower casing member 622 is of a dished shape and arranged below the upper casing member 621 to have an upper opening facing the upper casing member 621. The lower casing member 622 is joined to the upper casing member 621 using screws to define the storage chamber 625 inside the assembly of the casing members 621 and 622 in which the lens units 630 and the imaging system 650 are disposed.

A plurality of lens units 630 (two lens units 630 in the second embodiment) are disposed in the storage chamber 625 of the camera casing 620. Each of the lens units 630, as clearly illustrated in FIGS. 18 and 19, has a front end portion exposed outside the camera casing 620 through the common lens window 911 formed in the vertical wall 910 of the upper casing member 621. The lens units 630 have optical axes Aw, An, and At, respectively, which are offset from each other. The lens units 603, as clearly illustrated in FIG. 20, define different angles of view θw, θn, and θt around the optical axes Aw, An, and At, so that an optical image of the outside view 5 is inputted into the respective lens units 630 within the angles of view θw, θn, and θt.

The hood 640 is, as illustrated in FIGS. 18 and 19, molded using resin integrally with the bracket 611, so that it forms a portion of the bracket 611. As viewed from above the hood 640, an entire configuration thereof is of a disc shape symmetrical with respect to the optical axes Aw, An, and At of the lens units 630 in the lateral direction. The hood 640 includes the base wall 641 and the side walls 643.

The base wall 641 is, as illustrated in FIG. 18, disposed in the storage chamber 912 between the upper casing member 621 and the front windshield 3. The base wall 641 is placed close to the front windshield 3 toward the front end thereof. In other words, the front end of the base wall 641 is arranged closest to the front windshield 3. The bottom surface 641a of the base wall 641 expands in the shape of a substantially flat plane and faces the inner surface 3a of the front windshield 3 through the imaging space 710 defined on the optical axes Aw, An, and At illustrated in FIGS. 18 and 19. Light from the outside view 5 passes through the front windshield 3 and the imaging space 710 and then enters each of the lens units 630 in the form of an optical image within the image capturing range of the imaging system 650.

The side walls 643 extend symmetrically with each other about the optical axes Aw, An, and At, so that they surround the imaging space 710 in the lateral direction. The side walls 643 extend upward from side edges of the base wall 641 and are in the shape of a flat plate. An interval between the side walls 643 in the lateral direction gradually increases toward the front of the hood 640. The front ends of the lens unit 630 are exposed to the imaging space 710 through a gap between rear ends of the side walls 643. Each of the side walls 643 has a height from the base wall 641 which decreases toward the front of the base wall 641, thereby creating, as clearly illustrated in FIG. 18, the air gap 730 between each of the side walls 643 and the inner surface 3a of the front windshield 3. The air gaps 730 extend over the whole of the camera module 1a in the longitudinal direction.

With the above arrangements, the hood 640 defines the imaging space 710 depending upon the angles of view θw, θn, and θt of the lens units 630 to permit light from the outside view 5 within the image capturing range to enter the lens units 630. The hood 640 also defines the imaging space 710 to block light from the outside view 5 outside the image capturing range, for example, light reflected from the inner surface 3a of the front windshield 3 entering each of the lens units 630.

The imaging system 650 includes a plurality of imager units 651 assembled with the control substrate 654 and the control circuit 655. These components 651, 654, and 655 of the imaging system 650 are mounted in the storage chamber 625 of the camera casing 620.

The plurality of the imager units 651 (the three imager units 651 in the second embodiment) are arranged in place each behind one of the lens units 630. The imager units 651 are offset from each other in the longitudinal direction as a function of focal lengths of the lens units 630 determined as a function of the angles of view θw, θn, and θt which are different form each other. Each of the imager units 651 includes the imaging substrate 810, the image sensor 811, and the imaging circuit 812. The imaging substrate 810 is formed by a rigid board such as a glass epoxy board in the shape of a substantially rectangular flat plate.

The image sensor 811 is implemented by a color or back-and-white imager such as a CCD or a CMOS. The image sensor 811 is mounted on the imaging substrate 810. The image sensor 811 is equipped with a plurality of pixels arranged in a matrix shape made up of vertical and horizontal arrays extending in the vertical direction and the lateral direction. The imaging circuit 812 includes a plurality of circuit components which process an output of the image sensor 811 and is mounted on the imaging substrate 810.

In each of the imager units 651, light coming from the outside view 5 passes through the front windshield 3 and is then inputted into the image sensor 811 through a corresponding one of the lens units 630 in the form of an optical image. The image sensor 811 of each of the imager units 651 works to capture the optical image and outputs an image signal or data which is processed in the imaging circuit 812.

The control substrate 654 is a rigid board, such as a glass epoxy board. The control substrate 654 is in the shape of a substantially rectangular plate. The control substrate 654 is positioned between the casing members 621 and 622. The control substrate 654 has mounted thereon the external connector 842 exposed outside the camera casing 620. The external connector 842 is connected to an external circuit disposed outside the camera casing 620. The external connector 842 is mounted on the convex substrate portion 843 of the control substrate 654 which protrudes backward from the rear edge 844. Although not illustrated, the convex substrate portion 843 is arranged along with the camera casing 620 depending upon a location where the camera module 1a is secured to the front windshield 3 without interference with a stem of a rearview mirror or an electronic mirror in the passenger compartment 4.

The control circuit 655 is made of a plurality of circuit devices including a microcomputer and mounted on the control substrate 654. The control circuit 655 is connected to the imaging circuits 812 of the imager units 651 using the flexible substrates 840 each made of an FPC (flexible printed circuit) board. The control substrate 654 has formed therein a plurality of windows 841 through which the respective flexible substrates 840 pass. Specifically, the flexible substrates 840 connected to the imaging circuits 812 of the imager units 651 above the control substrate 654 pass through the windows 841 in the vertical direction and then are connected to the control circuit 655 below the control substrate 654.

The control circuit 655 works in conjunction with the imaging circuits 812 in the imager units 651 to control imaging operations including an exposure operation of the image sensors 811 of the imager units 651. The control circuit 655 also works in conjunction with the imaging circuits 812 of the imager units 651 perform image processing on outputs from the image sensors 811 of the imager units 651. These imaging control and image processing operations create outside images within ranges of the outside view 5 delimited by the angles of view θw, θn, and θt of the lens units 630. The outside images are produced so that an obstacle or a structural object existing within the angles of view θw, θn, and θt is recognizable. In the above way, the outside images are produced by the respective imager units 651 using light passing through the lens units 630. The control circuit 655 or the imaging circuit 812 of each of the imager units 651 may be engineered to perform at least one of the imaging control operation and the image processing operation.

The control circuit 655 has an image recognition function to recognize an object appearing on the outside images. Specifically, the control circuit 655 identifies the type of the object, for example, determines which of a pedestrian, a bicycle, and another vehicle the object represents as an obstacle or which of a signal (or a traffic light), a traffic sign, and a building the object represents as a structural object. The control circuit 655 also performs, as the image recognition function, for example, alignment to correct deviations of positional coordinates of the pixels representing the same points Pw, Pn, and Pt, as demonstrated in FIG. 22, from a reference point defined on the optical axes Aw, An, and At within the outside images produced by light rays passing through the lens units 630. Specifically, when the positional coordinates representing each of the same points Pw, Pn, and Pt (e.g., vanishing points) deviate from the reference point on the optical axes Aw, An, and At in at least one of the vertical direction (i.e., the y-axis) and the lateral direction (i.e., the x-axis), the control circuit 655 compensates for such deviations.

The control substrate 654 in the second embodiment corresponds to the wiring substrate 140 illustrated in FIGS. 2 to 5. The control circuit 655 corresponds to the ECU 110 illustrated in FIG. 2. The external connector 842 corresponds to the substrate-side connector 130 illustrated in FIGS. 2 to 4.

The structure of each of the lens units 630 will be described below in detail.

Figure 21:
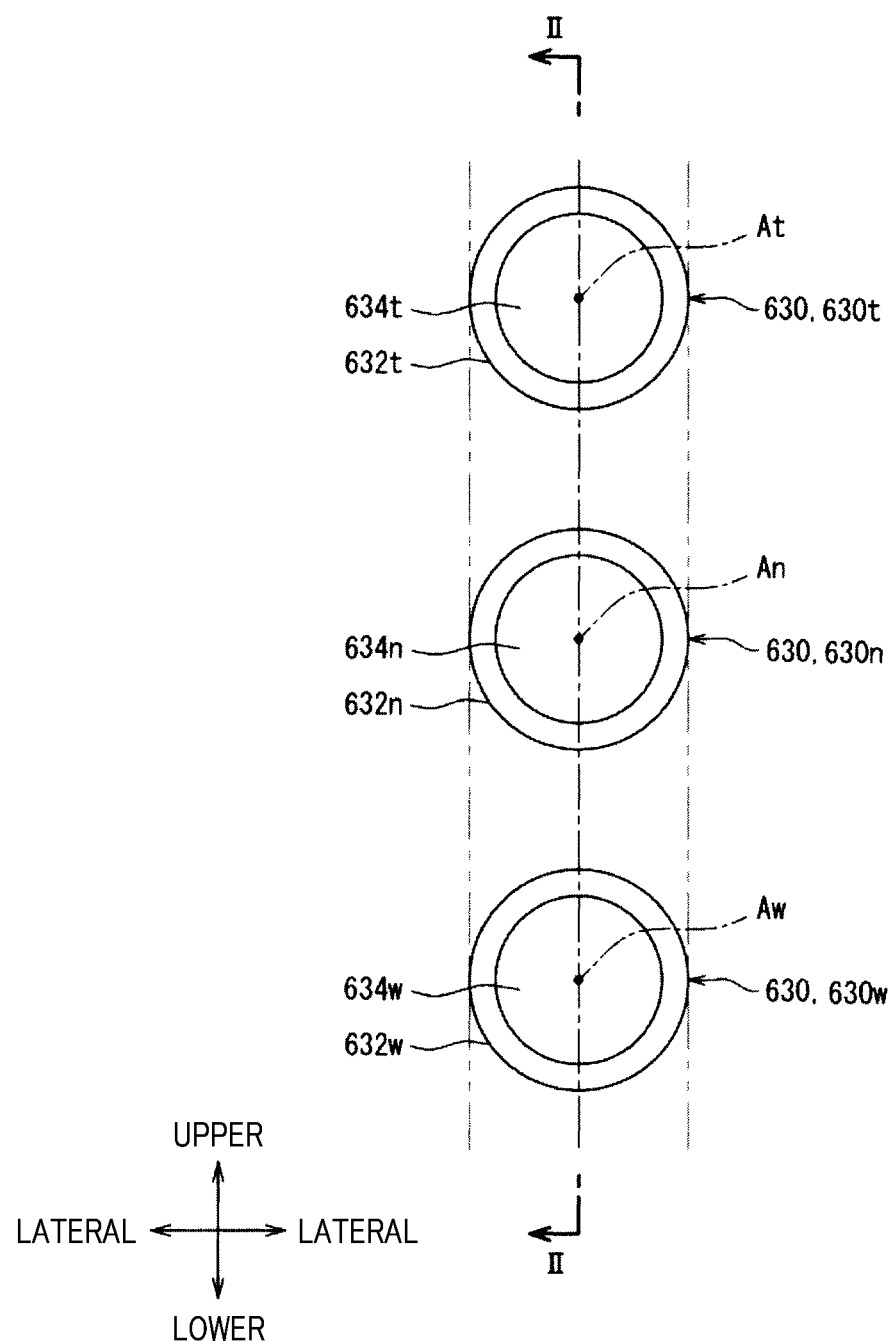
FIG. 21 is a front view which illustrates a positional relation among lens units in the second embodiment.

The wide-angle unit 630w illustrated in FIGS. 18, 19, and 21 that is one of the lens units 630 includes the wide-angle lens barrel 632w and the wide-angle lens 634w. The wide-angle lens barrel 632w is made of an easy-to-form hard material such as resin in a hollow shape. The wide-angle lens barrel 632w is secured to the upper casing member 621 using screws or adhesive. The wide-angle lens 634w is made of a transparent material such as glass in the form of a concave meniscus lens. The wide-angle lens 634w is disposed in the wide-angle lens barrel 632w along with a rear lens set serving to minimize chromatic aberration. The wide-angle lens barrel 632w is positioned to place the wide-angle lens 634w at a given interval away from the inner surface 3a of the front windshield 3. The wide-angle less 634w is located at the front end of the wide-angle unit 630w in front of the above rear lens set.

Figure 20:
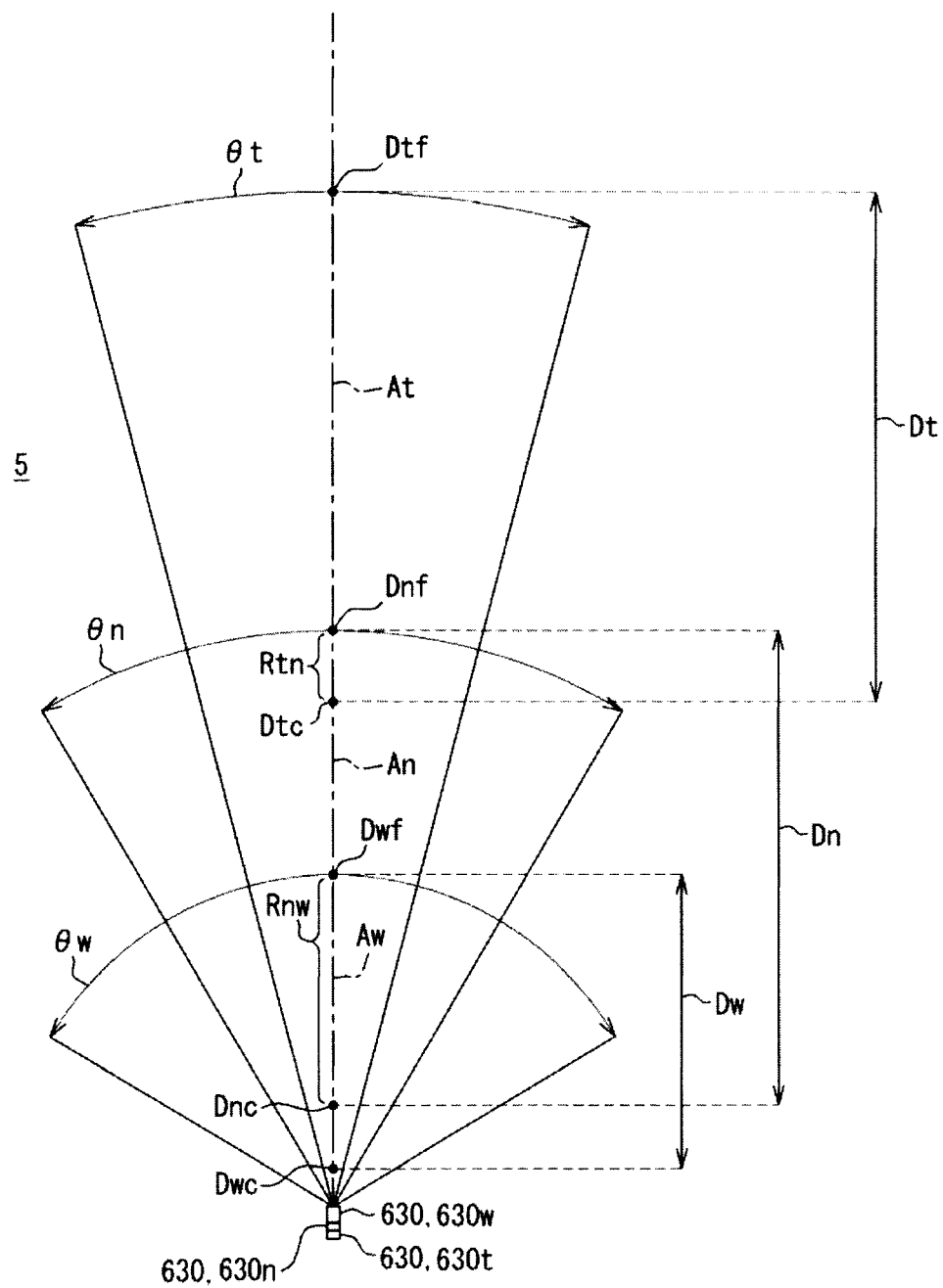
FIG. 20 is a schematic view which demonstrates image capturing ranges of lens units according to the second embodiment.

The wide-angle unit 630w, as illustrated in FIGS. 18, 20, and 21, has the optical axis Au) which is inclined slightly upward or downward from the rear to the front thereof or extends straight in the longitudinal direction. The angle of view θw of the wide-angle unit 630w is set to a wide angle of 120° using the wide-angle lens 634w, but may be selected to an angle wider than 120°. The depth of field Dw in the angle of view θw of the wide-angle unit 630w is set by the wide-angle lens 634w to a given range in the outside view 5 between the near point Dux near to an occupant in the vehicle 2 (which will also be referred to as a near side) and the far point Dwf far from the occupant (which will also be referred to as a far side).

The narrow-angle unit 630n that is, as illustrated in FIGS. 18, 19, and 21, one of the lens units 630 includes the narrow-angle lens barrel 632n and the narrow-angle lens 634n. The narrow-angle lens barrel 632n is made of an easy-to-form hard material such as resin in a hollow shape. The narrow-angle lens barrel 632n is secured to the upper casing member 621 using screws or adhesive. The narrow-angle lens 634n is made of a transparent material such as glass in the form of a concave meniscus lens. The narrow-angle lens 634n is disposed in the narrow-angle lens barrel 632n along with a rear lens set serving to minimize chromatic aberration. The narrow-angle lens barrel 632n is positioned to hold the narrow-angle lens 634n located at the front end of the narrow-angle unit 603n in front of the above rear lens set from being shifted both in the longitudinal direction and in the lateral direction just above the wide-angle lens 634w. With these arrangements, the front end of the wide-angle unit 630w is not located closer to the front of the camera module 1a than the front end of the narrow-angle unit 630n is.

The narrow-angle unit 630n, as illustrated in FIGS. 18, 20, and 21, has the optical axis An which is inclined slightly upward or downward from the rear to the front thereof or extends straight in the longitudinal direction. The optical axis An of the narrow-angle unit 630n is offset from the optical axis Aw of the wide-angle unit 630w only in the vertical direction. In other words, the optical axis An of the narrow-angle unit 630n extends parallel to the optical axis Aw of the wide-angle unit 630w in the longitudinal direction without any offset from the optical axis Aw in the lateral direction. The angle of view θn of the narrow-angle unit 630n is, as can be seen in FIG. 20, set to a middle angle of, for example, 60° which is smaller than the angle of view θw of the wide-angle unit 630w with aid of the narrow-angle lens 634n. This causes the angles of view θn and θw of the narrow-angle unit 630n and the wide-angle unit 630w to overlap each other. The depth of field Dn in the angle of view θn of the narrow-angle unit 630n is set by the narrow-angle lens 634n to a given range in the outside view 5 between the near point Dnc close to the occupant in the vehicle 2 and the far point Dnf far from the occupant.

Particularly, in the second embodiment, the far point Dwf of the wide-angle unit 630w is located closer to the front of the camera module 1a than the near point. Date of the narrow-angle unit 630n is. The near point Dnc of the narrow-angle unit 630n is located closer to the front of the camera module 1a than the near point Dwc of the wide-angle unit 630w. The far point Dnf of the narrow-angle unit 630n is located closer to the front of the camera module 1a than the far point Dwf of the wide-angle unit 630w is. The far point Dwf of the wide-angle unit 630w is located between the near point Dnc and the far point Dnf of the narrow-angle unit 630n. This causes the depths of field Dn and Dw of the narrow-angle unit 630n and the wide-angle unit 630w to overlap each other in the overlap range Rnw.

The telephoto unit 630t that is, as illustrated in FIGS. 18, 19, and 21, one of the lens units 630 includes the telephoto lens barrel 632t and the telephoto lens 634t. The telephoto lens barrel 632t is made of an easy-to-form hard material such as resin in a hollow shape. The telephoto lens barrel 632t is secured to the upper casing member 621 using screws or adhesive. The telephoto lens 634t is made of a transparent material such as glass in the form of a concave lens. The telephoto lens 634t is disposed in the telephoto lens barrel 632t along with a rear lens set serving to minimize chromatic aberration. The telephoto lens barrel 632t is positioned to hold the telephoto lens 634t located at the front end of the telephoto unit 603t in front of the above rear lens set from being shifted both in the longitudinal direction and in the lateral direction just above the narrow-angle lens 634n. With these arrangements, the front end of the narrow-angle unit 630n is not located closer to the front of the camera module 1a than the front end of the telephoto unit 630t is. The front end of the wide-angle unit 630w is also not located closer to the front of the camera module 1a than the telephoto unit 630t is.

The telephoto unit 630t, as illustrated in FIGS. 18, 20, and 21, has the optical axis At which is inclined slightly upward or downward from the rear to the front thereof or extends straight in the longitudinal direction. The optical axis At of the telephoto unit 630t is offset from the optical axes Aw and Aw of the wide-angle unit 630w and the narrow-angle unit 630n only in the vertical direction. In other words, the optical axis At of the telephoto unit 630t extends parallel to the optical axes Aw and Aw of the wide-angle unit 630w and the narrow-angle unit 630n in the longitudinal direction without any offset from the optical axes Aw and Aw in the lateral direction. The angle of view θt of the telephoto unit 630t is, as can be seen in FIG. 20, set to a narrow angle of, for example, 35° which is smaller than the angles of view θw and θn of the wide-angle unit 630w and the narrow-angle unit 630n with aid of the telephoto lens 634t. This causes the angles of view θt and θn of the telephoto unit 630t and the narrow-angle unit 630n to overlap each other and causes the angles of view θt and θw of the telephoto unit 630*t* and the wide-angle unit 630*w* to overlap each other. The depth of field Dt in the angle of view θt of the telephoto unit 630*t* is set by the telephoto lens 634*t* to a given range in the outside view 5 between the near point Dte close to the occupant in the vehicle 2 and the far point Dtf far from the occupant.

Particularly, in the second embodiment, the far point Dnf of the narrow-angle unit 630*n* is located closer to the front of the camera module 1*a* than the near point Dtc of the telephoto unit 630*t* is. The near point Dtc of the telephoto unit 630*t* is located closer to the front of the camera module 1*a* than the near point Dnc of the narrow-angle unit 630*n* and the near point Dwc and the far point Dwf of the wide-angle unit 630*w* are. Additionally, the far point Dtf of the telephoto unit 630*t* is located closer to the front of the camera module 1*a* than the far point Dnf of the narrow-angle unit 630*n* and the far point Dwf of the wide-angle unit 630*w* are. The far point Dnf of the narrow-angle unit 630*n* is located between the near point Dtc and the far point Dtf of the telephoto unit 630*t*. This causes the depths of field Dt and Dn of the telephoto unit 630*t* and the narrow-angle unit 630*n* to overlap each other in the overlap range Rtn. The far point Dwf of the wide-angle unit 630*w*, however, lies outside an interval between the near point Dtc and the far point Dtf of the telephoto unit 630*t*, so that the depths of field Dt and Dw of the telephoto unit 630*t* and wide-angel unit 630*w* are offset without any overlap therebetween.

As apparent from the above discussion, the second embodiment has first to fourth combinations of the lens units 630 overlapping each other in the vertical direction. Specifically, the first combination is made up of the wide-angle unit 630*w* and the narrow-angle unit 630*n* which are laid to overlap each other in the vertical direction. The second combination is made up of the wide-angle unit 630*w* and the telephoto unit 630*t* which are laid to overlap each other in the vertical direction. The third combination is made up of the narrow-angle unit 630*n* and the telephoto unit 630*t* which are laid to overlap each other in the vertical direction. The fourth combination is made up of the wide-angle unit 630*w*, the narrow-angle unit 630*n*, and the telephoto unit 630*t* which are laid to overlap each other in the vertical direction.

The wide-angle unit 630*w*, the narrow-angle unit 630*n*, and the telephoto unit 630*t* which provide the first to fourth combinations of the lens units 630 have the far points Dwf; and Dtf which are selected to meet equation 1 below. This causes limit ranges where images derived by light passing through the wide-angle unit 630*w*, the narrow-angle unit 630*n*, and the telephoto unit 630*t* are recognizable to depend upon the far points Dwf, Dnf, and Dtf, respectively.

$$Lf = F \cdot Sf / Wf \qquad (1)$$

where Lf is a distance between each of the wide-angle unit 630*w*, the narrow-angle unit 630*n*, and the telephoto unit 630*t* and a corresponding one of the far points Dwf, Dnf, and Dtf, F is a focal length of each of the wide-angle unit 630*w*, the narrow-angle unit 630*n*, and the telephoto unit 630*t* (i.e., a resultant focal range of each of the lens 634*w*, 634*n*, and 634*t* and a corresponding one of the rear lens sets), and Sf is a minimum size of an object whose image is recognizable at each of the far points Dwf, Dnf, and Dtf of the wide-angle unit 630*w*, the narrow-angle unit 630*n*, and the telephoto unit 630*t*. For instance, the minimum size Sf is selected to be a size of an object existing at each of the far points Dwf, Dnf; and Dtf required by vehicle control in an external circuit and set to a minimum of dimensions of an object which are predetermined depending upon the type of the object in horizontal and vertical directions. In Eq. 1, Wf represents a minimum pixel width required by the imager sensor 811 of each of the wide-angle unit 630*w*, the narrow-angle unit 630*n*, and the telephoto unit 630*t* of the imaging system 650 to recognize an image. For example, the minimum pixel width Wf is given by a total width of a group or matrix of an equal number of pixels of the image sensor 811 arrayed in the vertical and lateral directions thereof and also selected to a total width of a minimum number of the pixels required to recognize an image, as produced by the image sensor 811, using pattern matching techniques. In a case where the image sensor 811 is implemented by a color imager, a plurality of sub-pixels for respective RGB color filters are defined as one pixel to determine the minimum pixel width Wf.

Additionally, the wide-angle unit 630*w*, the narrow-angle unit 630*n*, and the telephoto unit 630*t* which provide the first to fourth combinations of the lens units 630 have the near points Dwc, Dnc, and Dtc which are each selected to meet equation 2 below. This causes focusing limit ranges where images derived by light passing through the wide-angle unit 630*w*, the narrow-angle unit 630*n*, and the telephoto unit 630*t* are visually in focus.

$$Lc = F \cdot Dc / Pc \qquad (2)$$

where Lc is a distance between each of the wide-angle unit 630*w*, the narrow-angle unit 630*n*, and the telephoto unit 630*t* and a corresponding one of the near points Dwc, Dnc, and Dtc, F is, like in Eq. 1, a focal length of each of the wide-angle unit 630*w*, the narrow-angle unit 630*n*, and the telephoto unit 630*t*, and Dc is an effective diameter of each of the wide-angle unit 630*w*, the narrow-angle unit 630*n*, and the telephoto unit 630*t*. For example, the effective diameter Dc is selected to be a diameter of a window of each of the lens barrels 632*w*, 632*n*, and 632*t* through which the lenses 634*w*, 634*n*, and 634*t* are exposed outside the wide-angle unit 630*w*, the narrow-angle unit 630*n*, and the telephoto unit 630*t*. In Eq. 2, Pc represents a pixel pitch of a plurality of pixels in each of the imager units 651 for the wide-angle unit 630*w*, the narrow-angle unit 630*n*, and the telephoto unit 630*t* of the imaging system 650. For instance, the pixel pitch Pc is set to a common distance between adjacent pixels of the image sensor 811 which are arrayed in the vertical and lateral directions. In a case where the image sensor 811 is implemented by a color imager, a plurality of sub-pixels for respective RGB color filters are defined as one pixel to determine the pixel pitch Pc.

The second embodiment offers the following beneficial advantages.

The first to fourth combinations of lens units 630 are provided to have the angles of view θw, θw, and θt which are different from each other and defined around the vertically offset optical axes Aw, An, and At and at least two of which are laid to overlap each other. The lens units 630 are arranged adjacent each other in the vertical direction of the vehicle 2, so that at least two of the optical axes Aw, An, and At are located close to each other in the lateral direction of the vehicle 2. This minimizes a deviation of positional coordinates of pixels on which each of the same points Pw, Pn, and Pt, as demonstrated in FIG. 22, appears from a corresponding one of the optical axes Aw, An, and At in the lateral direction within images produced by light passing through the respective lens units 630 providing the first to fourth combinations, thereby enhancing the accuracy in position of images in the lateral direction which are formed by light passing through the lens units 630 of the first to fourth combinations. Referring to the second combination as an example, the wide-angle unit 630w and the telephoto unit 630t which is designed as a narrow-angle unit different from the narrow-angle unit 630n and is also narrower than the angle of view θw of the wide-angle unit 630w serve to provide an enhanced accuracy in position of images in the lateral direction.

Figure 22A:
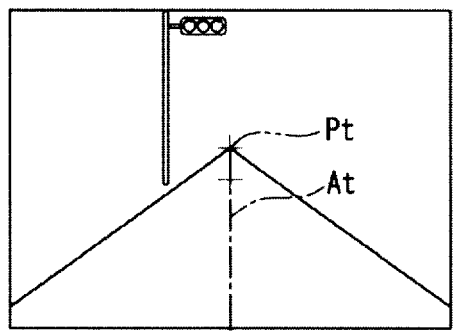
FIGS. 22(a), 22(b), and 22(c) are schematically front views which demonstrate outside images derived by light passing through lens units.
Figure 22B:
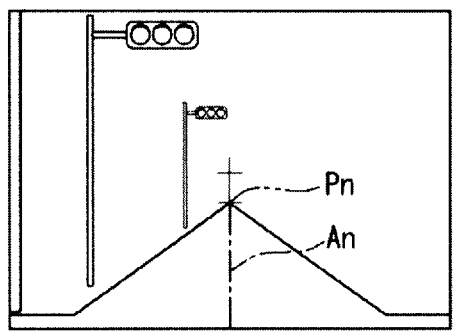
Figure 22C:
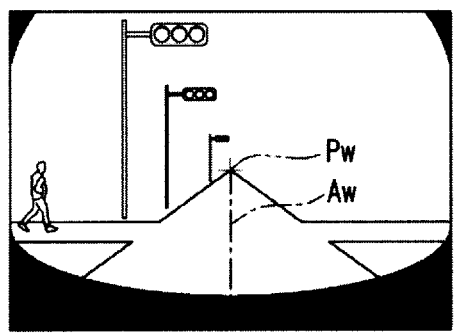

The first to fourth combinations of lens units 630 are provided to have the optical axes Aw, An, and At at least two of which are offset from each other only in the vertical direction of the vehicle 2, thereby decreasing a difference between positional coordinates of pixels representing the same points Pw, Pn, and Pt, as demonstrated in FIG. 22, in the lateral direction within images produced by light passing through the respective lens units 630 providing the first to fourth combinations. This facilitates the ease with which the above deviations in the lateral direction are compensated for.

The first to third combinations of the vertically overlapping lens units 630 provide the depths of field Dw, Dn, and Dt which are defined to create the overlap ranges Rnw and Rtn where at least two of the depths of field Dw, Dn, and Dt overlap each other. This enables images, as produced by light passing through the lens unit 630 of the first to third combinations, to be focused in a wider range including the overlap ranges Rnw and Rtn to enhance the accuracy in positions of the images in the lateral direction.

The wide-angle unit 630w offering the wide angle of view θw and the narrow-angle unit 630n offering the narrow angle of view θn in the first to fourth combinations are laid adjacent each other in the vertical direction to have the optical axes Aw and An arranged close to each other in the lateral direction, thereby minimizing a difference between positional coordinates of pixels representing the same points Pw and Pn in lateral direction on images formed by light passing through the wide-angle unit 630w and the narrow-angle unit 630n. This enables images, as produced by light passing through the narrow-angle unit 630n and the wide-angle unit 630w whose the far point Dwf of the depth of field Dw is located closer to the front of the camera module 1a than the near point Dnc of the depth of field Dn is, to be focused in a wider range including the overlap range Rnw where the depth of field Dn and the depth of field Dw overlap each other, thereby enhancing the accuracy in positions of the images in the lateral direction.

The fourth combination of the vertically overlapping lens units 630: the wide-angle unit 630w, the narrow-angle unit 630n, and the telephoto unit 630t whose angle of view θt smaller than those of the wide-angle unit 630w and the narrow-angle unit 630n have the optical axes Aw, An, and At located close to each other in the lateral direction, thereby minimizing a difference between positional coordinates of pixels representing the same points Pw, Pn, and Pt in lateral direction on images formed by light passing through the wide-angle unit 630w, the narrow-angle unit 630n, and the telephoto unit 630. This enables images, as produced by light passing through the telephoto unit 630t, the narrow-angle unit 630n whose far point Dnf of the depth of field Dn is located closer to the front of the camera module 1a than the near point Dtc of the depth of field Dt of the telephoto unit 630t is, and the wide-angle unit 630w having the depth of field Dw, to be focused in a wider range including the overlap ranges Rtn and Rnw each in which two of the depths of field Dt, Drt, and Dw overlap each other, thereby enhancing the accuracy in positions of the images in the lateral direction.

The lens units 630 of the first combination whose angles of view θn and θw overlap each other have the depths of field Dn and Dw. The far point Dwf of the depth of field Dw is set between the near point Dnc and the far point Dnf of the depth of field Dn in the outside view 5, thereby creating the overlap range Rnw in which the depths of field Dn and Dw overlap each other. The far points Dnf and Dwf in the first combination of the lens units 630 define the limit ranges where images derived by light passing through the respective lens units 630 are recognizable. It is, thus, possible to recognize or identify within the overlap range Rnw where the depths of field Dn and Dw overlap each other a moving object appearing on an image derived by light passing through each of the lens units 630 of the first combination. This ensures the stability in recognizing or identifying a moving object in the overlap range Rnw on a captured outside image without losing it.

The lens units 630 of the third combination whose angles of view θt and θn overlap each other have the depths of field Dt and Dn. The far point Dnf of the depth of field Dn is set between the near point Dtc and the far point Dtf of the depth of field Dt in the outside view 5, thereby creating the overlap range Rtn in which the depths of field. Dt and Dn overlap each other. The far points Dtf and Dnf in the third combination of the lens units 630 define the limit ranges where images derived by light passing through the respective lens units 630 are recognizable. It is, thus, possible to recognize or identify within the overlap range Rtn where the depths of field Dt and Dn overlap each other a moving object appearing on an image derived by light passing through each of the lens units 630 of the third combination. This ensures the stability in recognizing or identifying a moving object in the overlap range Rtn on a captured outside image without losing it.

The lens units 630 of the first and third combination have the far points Dwf, Dnf, and Dtf which are selected to meet the above Eq. 1. The far points Dwf, Dnf, and Dtf accurately define the limit ranges where images derived by light passing through the respective lens units 630 are recognizable. This eliminates a risk that a moving object within the overlap range Rnw or Rtn is lost due to a failure in recognizing an image on which the moving object appears.

The lens units 630 of the first and third combination have the near points Dwc, Dnc, and Dtc which are selected to meet the above Eq. 2. The near points Dwc, Dnc, and Dtx accurately define the focusing limit ranges where images derived by light passing through the respective lens units 630 are focused. This eliminates a risk that a moving object within the overlap range Rnw or Rtn is lost due to a failure in focusing an image on which the moving object appears.

An image captured by the camera module 1a in which one of the ECUs 110 is installed is transmitted at high speeds to the other ECUs 110 through the in-vehicle communication system 100. This facilitates the ease with which, for example, an autonomous driving ECU uses an image captured by the camera module 1a to assist an operator in driving a vehicle.

While the present invention has been disclosed in terms of the preferred embodiments in order to facilitate better understanding thereof, it should be appreciated that the invention can be embodied in various ways without departing from the principle of the invention. Therefore, the invention should be understood to include all possible embodiments and modifications to the shown embodiments which can be embodied without departing from the principle of the invention as set forth in the appended claims.

What is claimed is:

1. An in-vehicle communication system comprising: a plurality of ECUs; and communication lines which connect the ECUs together in a form of a daisy chain, each of the communication lines including a first wire pair and a second wire pair, the communication lines providing at least one of the ECUs other than those lying at ends of the daisy chain with connections to the first wire pair and the second wire pair, wherein the in-vehicle communication system has a maximum transferable data length of 64 bytes or more and works to select a transmission speed of data transfer from one of a plurality of transmission speeds of more than or equal to 2 Mbps, wherein each of the ECUs includes a wiring substrate and a substrate-side connector which achieves connections of the wiring substrate with the communication lines, the substrate-side connector including a connector case and a plurality of surface-mounted connector pins which are disposed outside the connector case and connected to the wiring substrate, and wherein the plurality of surface-mounted connector pins of each of the ECUs includes a first connector pin pair connected to the first wire pair and a second connector pin pair connected to the second wire pair, the first connector pin pair having leads of the first connector pin pair whose lengths are equal to each other, the second connector pin pair having leads of the second connector pm pair whose lengths are equal to each other, the lengths of the leads of the first connector pin pair being different from the lengths of the leads of the second connector pin pair.

2. An in-vehicle communication system as set forth in claim 1, wherein the wiring substrate has a plurality of lands connected to the plurality of surface-mounted connector pins of a corresponding one of the ECUs, wherein the plurality of lands include a first top-voltage land and a first bottom-voltage land which are connected to the first wire pair and also include a second top-voltage land and a second bottom-voltage land which are connected to the second wire pair, wherein the first top-voltage land and the second top-voltage land are arranged adjacent each other without any land therebetween, the first top-voltage and the second top-voltage being connected together through a first wiring pattern on the wiring substrate, and wherein the first bottom-voltage land and the second bottom-voltage land are arranged adjacent each other without any land therebetween, the first bottom-voltage land and the second bottom-voltage land being connected together through a second wiring pattern on the wiring substrate, and wherein the top-voltage is a voltage higher than the bottom-voltage.

3. An in-vehicle communication system as set forth in claim 2, wherein the first connector pin pair includes a first top-voltage connector pin connected to the first top-voltage land and a first bottom-voltage connector pin connected to the first bottom-voltage land, wherein the second connector pin pair includes a second top-voltage connector pin connected to the second top-voltage land and a second bottom-voltage connector pin connected to the second bottom-voltage land, wherein when the wiring substrate is placed horizontally, the first top-voltage connector pin and the second top-voltage connector pin have first protrusions which are exposed outside the connector case and laid to overlap each other in a vertical direction of the wiring substrate, and wherein the first bottom-voltage connector pin and the second bottom-voltage connector pin have second protrusions which are exposed outside the connector case and laid to overlap each other in the vertical direction.

4. An in-vehicle communication system comprising: a plurality of ECUs; and communication lines which connect the ECUs together in the a form of a daisy chain, each of the communication lines including a first wire pair and a second wire pair, the communication lines providing at least one of the ECUs other than those lying at ends of the daisy chain with connections to the first wire pair and the second wire pair, wherein the in-vehicle communication system has a maximum transferable data length of 64 bytes or more and works to select a transmission speed of data transfer from one of a plurality of transmission speeds of more than or equal to 2 Mbps, wherein the ECUs include a camera ECU to control an in-vehicle camera, wherein each of the ECUs includes a wiring substrate and a substrate-side connector which achieves connections of the wiring substrate with the communication lines, the substrate-side connector including a connector case and a plurality of surface-mounted connector pins which are disposed outside the connector case and connected to the wiring substrate, and wherein the plurality of surface-mounted connector pins of each of the ECUs includes a first connector pin pair connected to the first wire pair and a second connector pin pair connected to the second wire pair, the first connector pin pair having leads of the first connector pm pair whose lengths are equal to each other, the second connector pin pair having leads of the second connector pin pair whose lengths are equal to each other, the lengths of the leads of the first connector pin pair being different from the lengths of the leads of the second connector pin pair.

\* \* \* \* \*